United States Patent
Xu et al.

(10) Patent No.: US 12,483,758 B2
(45) Date of Patent: Nov. 25, 2025

(54) SYSTEM AND METHODS FOR PROVIDING PERSONALIZED AUDIO OF A LIVE EVENT

(71) Applicant: Adeia Guides Inc., San Jose, CA (US)

(72) Inventors: Ning Xu, Irvine, CA (US); Zhiyun Li, Kenmore, WA (US); Jean-Yves Couleaud, Mission Viego, CA (US); Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 227 days.

(21) Appl. No.: 18/214,297

(22) Filed: Jun. 26, 2023

(65) Prior Publication Data
US 2024/0430536 A1 Dec. 26, 2024

(51) Int. Cl.
*H04N 21/4728* (2011.01)
*H04N 21/2187* (2011.01)
*H04N 21/442* (2011.01)
*H04N 21/81* (2011.01)

(52) U.S. Cl.
CPC ..... *H04N 21/4728* (2013.01); *H04N 21/2187* (2013.01); *H04N 21/44218* (2013.01); *H04N 21/8106* (2013.01)

(58) Field of Classification Search
CPC ........... H04N 21/4728; H04N 21/2187; H04N 21/44218; H04N 21/8106
See application file for complete search history.

(56) References Cited

U.S. PATENT DOCUMENTS

| | | | |
|---|---|---|---|
| 5,625,697 A * | 4/1997 | Bowen | H04M 9/08 379/202.01 |
| 10,531,137 B1 * | 1/2020 | Matak | A63B 24/0062 |
| 2017/0161772 A1 | 6/2017 | Xu et al. | |
| 2017/0318275 A1 * | 11/2017 | Khalid | H04N 23/698 |
| 2018/0374268 A1 * | 12/2018 | Niles | H04N 21/21805 |
| 2019/0105568 A1 * | 4/2019 | Platt | A63F 13/52 |
| 2019/0349608 A1 * | 11/2019 | Pollet | H04N 21/2401 |
| 2020/0183773 A1 | 6/2020 | Brehm | |
| 2022/0337886 A1 * | 10/2022 | Orellana Gonzalez | H04N 21/2187 |
| 2023/0036192 A1 * | 2/2023 | Alakoye | H04H 60/06 |
| 2023/0360074 A1 * | 11/2023 | Cho | G06Q 30/02 |
| 2024/0007688 A1 * | 1/2024 | Born | G10L 21/0216 |
| 2024/0397121 A1 * | 11/2024 | Lowery | H04N 21/21805 |

OTHER PUBLICATIONS

"Get a Front Row Seat to NBA Games on Meta Quest," https://about.fb.com/news/2023/01/nba-games-in-vr-on-quest/, Jan. 23, 2023.
Daley et al., "NBA Returns: Audio in the Bubble Features Mics From Floor to Ceiling," https://www.sportsvideo.org/2020/08/10/nba-returns-audio-in-the-bubble/, Aug. 10, 2020.
(Continued)

*Primary Examiner* — Nicholas T Corbo
(74) *Attorney, Agent, or Firm* — HALEY GUILIANO LLP

(57) ABSTRACT

Systems, methods and apparatuses are described herein for receiving user input via a user interface; determining, based on the received user input, a particular portion of interest corresponding to a location at a live event; identifying one or more microphones in a vicinity of the location corresponding to the particular portion of interest at the live event; and causing audio detected by the one or more microphones to be generated for output.

20 Claims, 14 Drawing Sheets

(56) References Cited

OTHER PUBLICATIONS

Dimitrije Curcic, "NBA revenue statistics (2001-2022)," https://runrepeat.com/nba-revenue-statistics, Jul. 3, 2023.
Scott Roeben, "Everything You Need to Know About MSG Sphere in Las Vegas," https://www.casino.org/vitalvegas/everything-you-need-to-know-about-msg-sphere-in-las-vegas, Aug. 25, 2021.
"Capturing Volumetric Audio to ring in the future of immersive media for sports broadcasting," https://www.svgeurope.org/blog/headlines/capturing-volumetric-audio-to-ring-in-the-future-of-immersive-media-for-sports-broadcasting/, Oct. 17, 2022.

* cited by examiner

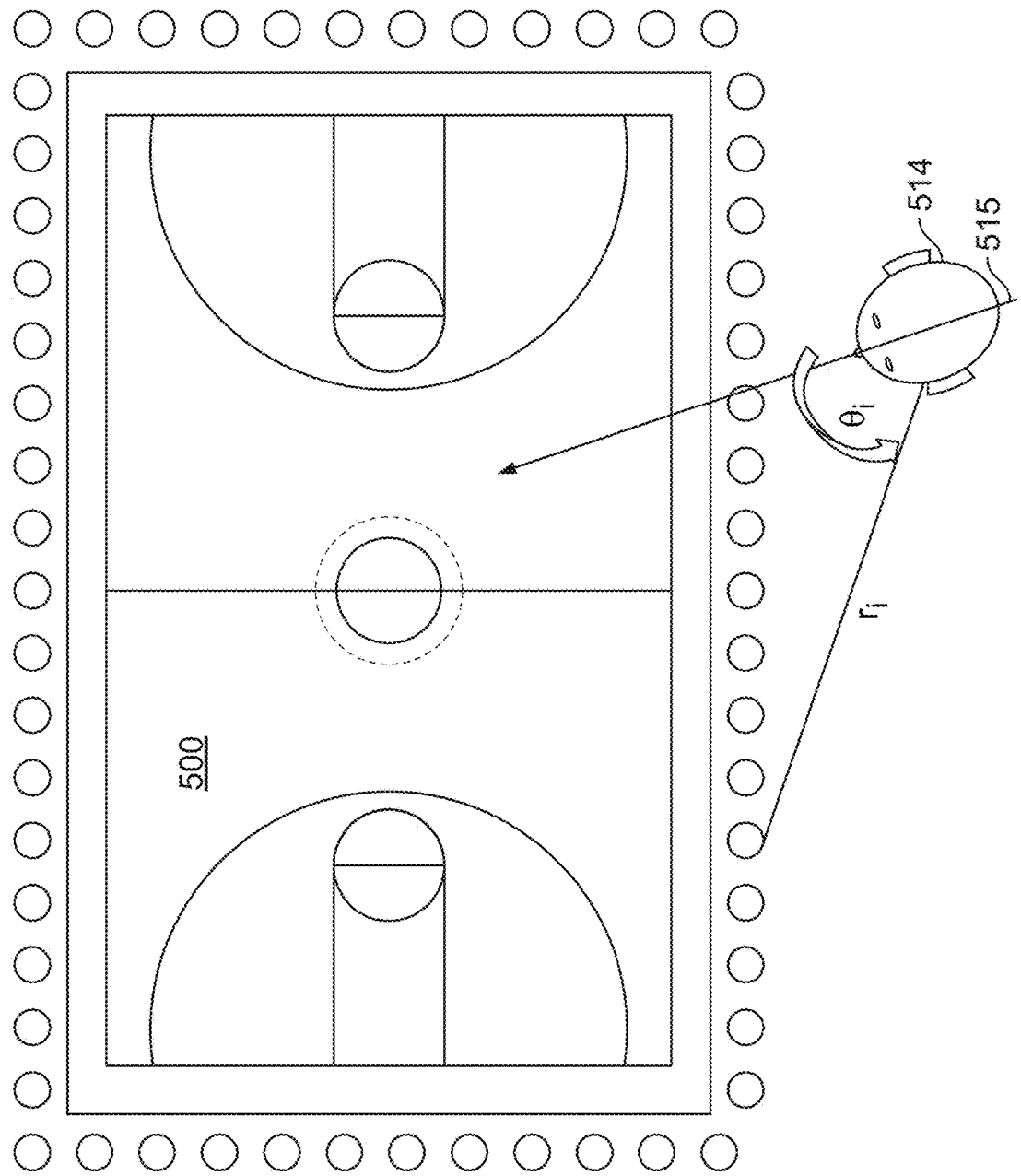

SYSTEM AND METHODS FOR PROVIDING PERSONALIZED AUDIO OF A LIVE EVENT

BACKGROUND

The present disclosure is directed to systems and methods for providing personalized audio of a live event to a user. More particularly, techniques are disclosed for determining a particular portion of interest of the live event, and generating for output to the user audio detected by microphones in the vicinity of the particular portion of interest.

SUMMARY

Modern media distribution systems enable a user to access more media content than ever before, via more devices than ever before, and in various ways to enhance and/or supplement an experience. As an example, many users enjoy consuming broadcasts of certain live events (e.g., sporting events such as the Super Bowl) from their homes, homes of friends or family, or at a public place. As another example, many users enjoy watching National Basketball Association (NBA) games. Broadcasts of NBA games, and many other televised sports, often provide play-by-play and color commentary by announcers, as well as a "mic'd up" segment featuring audio and conversations of players, coaches or referees, as detected by, e.g., numerous microphones installed at various locations on and around the basketball court (as well as from microphones placed on the clothing of the players, coaches, and/or referees). In the NBA, such a microphone matrix can deliver in-game player conversations for, e.g., replays, recaps, and other in-game features. However, generally, such audio from participants is not live and is selected by video editors and/or telecast producers during a break in action, and often censors conversations that may include coarse language, strategy, etc. While fans at home are typically provided with an entertaining experience, there is no personalized choice and the same "mic'd up" segment is provided to all viewers at home regardless of the user's specific interests. Moreover, fans or spectators who actually attend the game and are present at the venue cannot enjoy a similar audio experience, unless the spectators are sitting close enough to the action to hear such sounds. In addition, while many fans cannot afford certain seats (e.g., courtside seats) at an NBA game, there is no mechanism to enable users to experience the audio environment of such seats from another location (e.g., a nosebleed seat at the venue or at another location).

To help overcome these problems, the present disclosure discloses methods, systems and apparatuses for receiving user input via a user interface. Implementing any of the one or more of the techniques described herein, a system or systems may be configured to determine, based on the received user input, a particular portion of interest corresponding to a location at a live event, and identify one or more microphones in a vicinity of the location corresponding to the particular portion of interest at the live event. The particular portion of interest or location may be referred to as a "hot spot." The system(s) may be configured to cause audio detected by the one or more microphones to be generated for output to the user.

Such aspects enable a personalized audio experience to be automatically provided to users (e.g., spectators in attendance at a live event or consuming the live event from a different location) in real-time, while the performance of the event is occurring. For example, such features enable suitable microphone(s) to be identified, to enable a user to be provided with audio associated with a particular entity (e.g., a particular athlete, or an object, such as, for example, a basketball), or a particular event (e.g., a fight breaking out) of the live event, while the performance of the live event is occurring. As another example, such features enable suitable microphone(s) to be identified, to enable a user to be provided with audio that replicates the audio experience at a different location at the live event (e.g., a different seat in an arena than the user's seat, such as, for example, a front row seat).

In some embodiments, a plurality of microphones are located at respective locations at the live event. The system(s) may identify the one or more microphones by identifying a subset of the plurality of microphones to be used to detect the audio. The system(s) may cause the audio detected by the subset of the plurality of microphones to be generated for output by receiving a plurality of audio signals detected by the subset of the plurality of microphones; determining a weighted combination of the plurality of audio signals; and synthesizing the plurality of audio signals based on the weighted combination. The subset of the plurality of microphones may be identified based on a portion of interest of the live event that has been identified. The portion of interest may be identified automatically (e.g., without user input) or manually or semi-manually (e.g., in a manner responsive to user input). In some embodiments, the portion of interest may be explicitly indicated by user input. In some embodiments, the portion of interest may be inferred by one or more described systems from user input that does not explicitly indicate the portion of interest.

In some embodiments, the system(s) may be configured to generate for display at the user interface an option to indicate the particular portion of interest from among a plurality of candidate portions of interest at the live event, wherein receiving the user input comprises receiving selection via the user input interface of the option corresponding to the particular portion of interest.

In some embodiments, receiving the user input interface comprises detecting a gaze of a user, and the system(s) may be configured to determine a location within a performance occurring at the live event at which the detected gaze of the user is directed, and determine as the particular portion of interest, from among a plurality of candidate portions of interest at the live event, the location at which the gaze of the user is directed.

In some embodiments, the system(s) may be configured to determine, based on one or more video stream of the live event, a plurality of candidate portions of interest. The system(s) may be configured to determine, based on the received user input, the particular portion of interest by identifying, based on the received user input, a potential portion of interest; comparing the potential portion of interest to the plurality of candidate portions of interest; and determining the particular portion of interest based on the comparison.

In some embodiments, the system(s) may be configured to determine an orientation of a user, associated with the user input, in relation to a performance occurring at the live event; input to a trained machine learning model an indication of the orientation and indications of a plurality of candidate portions of interest; and determine, based on the inputting to the trained machine learning model, the particular portion of interest based on an output of the trained machine learning model. In some embodiments, the user associated with the user input is in attendance at the live event, and the system(s) may be further configured to determine a location of the user at the live event, wherein the inputting to the trained machine learning model further comprises inputting the location of the user to the trained machine learning model.

In some embodiments, the live event is a sporting event, and causing the audio detected by the one or more microphones to be generated for output further comprises merging the audio detected by the one or more microphones with audio commentary from a broadcast of the sporting event.

In some embodiments, the particular portion of interest is a location of a particular performer participating in a performance occurring at the live event, or is a location of a particular object being interacted with by one or more performers participating in the performance occurring at the live event. The particular performer or particular object may be identified without user input. In some instances, the particular performer or object may be identified based on user input.

In some embodiments, the location corresponding to the particular portion of interest is a location of a particular object or person associated with the live event, and the system(s) may be configured to, based on the received input, track a plurality of locations of the particular entity over time; identify the one or more microphones by identifying, for each respective tracked location of the plurality of locations of the particular object, at least one microphone in a vicinity of the respective tracked location; and cause the audio detected (by the one or more microphones at each respective tracked location) to be generated for output. In some instances, the particular object or person may be referred to as the tracked object or person. If desired, the tracked locations of the tracked object or person may be referred to as "hotspots."

In some embodiments, the system(s) may be configured to determine a location at the live event; reconstruct an audio experience as perceived at such location based on audio detected by a plurality of microphones at the live event; and generate for output the reconstructed audio experience.

In some embodiments, the system(s) may be configured to monitor the audio detected by the one or more microphones; and based on determining that a portion of the audio detected by the one or more microphones comprises profanity, a private conversation or a strategic conversation related to the performance of the live event or is otherwise not permitted to be shared with the user, prevent the portion of the audio from being generated for output to the user.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 5A-5D shows an illustrative scenario for providing audio from a live event to a user, in accordance with some embodiments of this disclosure.

DETAILED DESCRIPTION

Figure 1A:
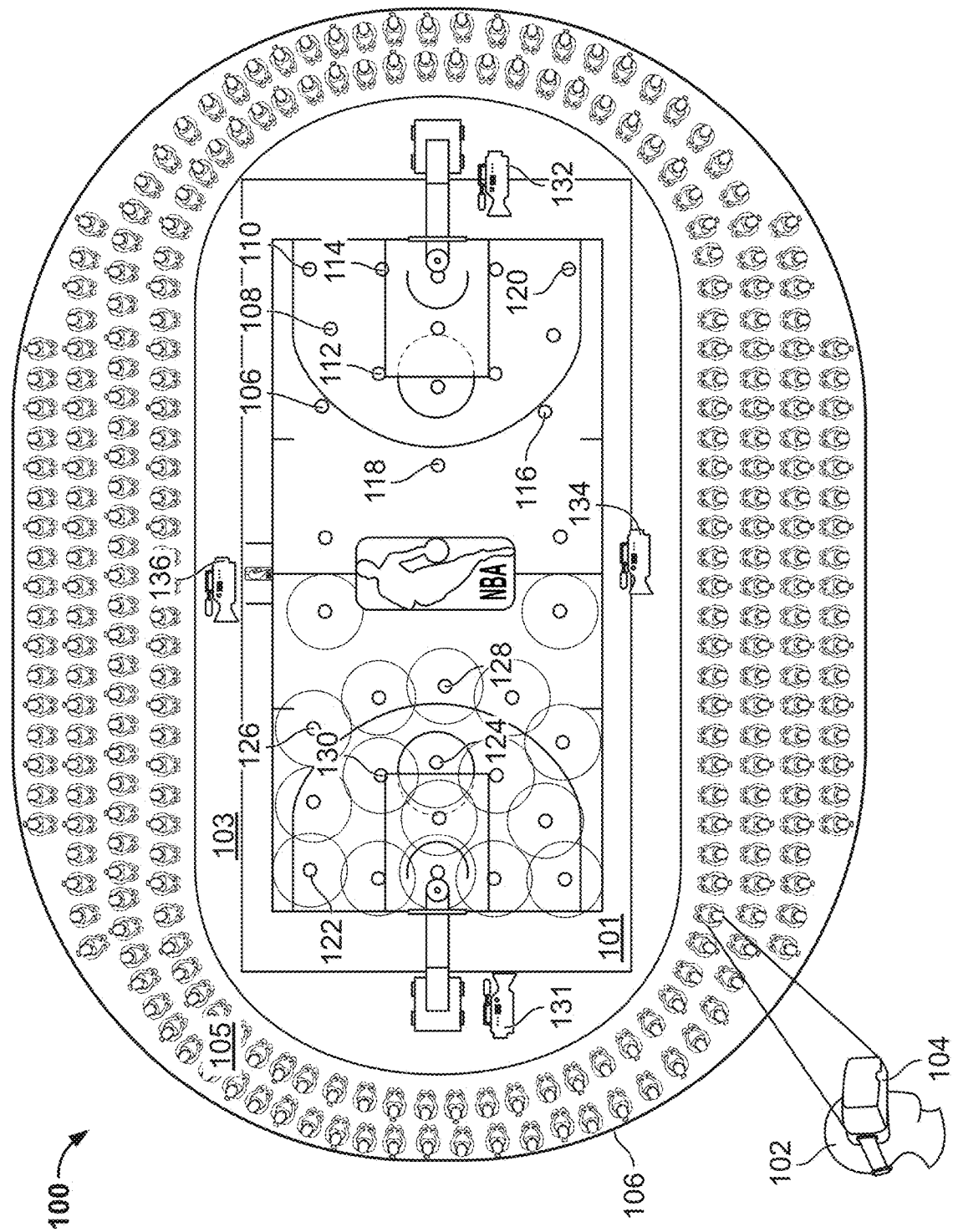
FIG. 1A shows an illustrative live event, in accordance with some embodiments of this disclosure.

FIG. 1A shows an illustrative live event, in accordance with some embodiments of this disclosure. While in the example of FIG. 1A, the live event is depicted as a basketball game at a basketball arena, stadium, or gym 100, it should be appreciated that the present disclosure is applicable to any suitable live event, e.g., a professional or collegiate or other level of a sporting event, such as, for example, a football game, a baseball game, a hockey game, a soccer match, a tennis match, a golf tournament, or the Olympics, or any other suitable sporting event, or any combination thereof; a concert; a play or theater or drama performance; a political debate or rally; a video game tournament; or any other suitable event at any suitable venue; or any combination thereof.

As shown in FIG. 1A, arena 100 comprises basketball court 101 where a plurality of performers (e.g., athletes) participate in a performance (e.g., playing in a basketball game), and referees officiate the game and enforce the rules of basketball (e.g., call fouls on players). As a non-limiting example, the live event may correspond to a basketball game in which the Los Angeles Lakers are competing against the Golden State Warriors. Arena 100 may comprise area 103 at which each team's bench, coaches, announcers, camera crew, other staff for the teams participating in the basketball game and/or league in which the teams play, and/or any other suitable personnel, may be seated or otherwise present during the basketball game. Arena 100 may further comprise spectator area 105 (e.g., including stands, seats, skyboxes or other areas for audience members to watch the performance occurring at the live event). In some embodiments, at least a portion of spectator area 105 may overlap with area 103, e.g., one or more fans may be seated next to players or coaches sitting on the bench.

As shown in FIG. 1A, arena 100 comprises a plurality of microphones 106, 108, 110, 112, 114, 116, 118, 120, 122, 124, 126, 128, 130 . . . n, at respective locations at the live event. The plurality of microphones may comprise any suitable number of microphones and/or type of microphone (e.g., analog microphones, digital microphones, capacitive microphones, ribbon microphones, shotgun microphones, dynamic microphones, condenser microphones, bi-directional or unidirectional or omnidirectional microphones)

installed at various portions of basketball court 101 and configured to convert detected sound waves to a corresponding electrical signal. In some embodiments, one or more of the plurality of microphones may be positioned underneath the floor of the court, on a backboard and/or rim and/or net (and/or any other suitable portion of a structure) of each basketball hoop on the court and/or at any other suitable location), area 103, spectator area 105, or any other suitable portion of arena 100, or any combination thereof. The microphones may detect audio of in-game sounds (e.g., sneaker squeaks and basketball bounces or any other suitable sounds or any combination thereof) and/or conversations between coaches, players, referees or fans, and/or voices of coaches, players, referees or fans. In some embodiments, one or more of the plurality of microphones may be placed on the clothing of the players, coaches, and/or referees, or other individuals (e.g., an owner of a team competing in the game, or a celebrity in the spectator area 105).

In some embodiments, a plurality of cameras, e.g., 131, 132, 134, . . . n, or any other suitable sensor or device or combination thereof, may be configured to capture images and/or video of the live event, and such images and/or video may be combined to generate one or more video streams of the live event, e.g., for presentation on one or more displays (e.g., a jumbotrons, televisions and/or any other suitable device) at the live event or at other locations (e.g., for users watching at home or with friends at another home or public place).

As shown in FIG. 1A, a viewer or user 102 may be present in spectator area 105 at the live event, along with a plurality of other users or viewers (e.g., thousands of other audience members at the live event). User 102 may be using, wearing and/or be associated with user equipment 104. User equipment 104 may comprise or correspond to a headset; headphones and/or earbuds; a mobile device such as, for example, a smartphone or tablet; a laptop computer; a personal computer; a desktop computer; a smart television; a smart watch or wearable device; smart glasses; a stereoscopic display; a wearable camera, extended reality (XR) glasses; XR goggles; an XR head-mounted display (HMD); near-eye display device; any suitable portable device that can deliver audio; or any other suitable user equipment or computing device; or any combination thereof. In some embodiments, user equipment 104 may be brought to the live event by user 102 and owned by user 102, or may be provided to user 102 by the organization hosting the live event for use at the live event, e.g., may be present at each seat of the audience members, or may correspond to any other suitable user equipment.

XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

In some embodiments, a media application may be executed at least in part on user equipment 104 and/or at one or more remote servers and/or at or distributed across any of one or more other suitable computing devices, in communication over any suitable number and/or types of networks (e.g., the Internet). The media application may be configured to perform the functionalities (or any suitable portion of the functionalities) described herein. In some embodiments, the media application may be a stand-alone application, or may be incorporated as part of any suitable application, e.g., one or more broadcast content provider applications, broadband provider applications, live content provider applications, media asset provider applications, XR applications, video or image or electronic communication applications, social networking applications, image or video capturing and/or editing applications, or any other suitable application(s), or any combination thereof.

As referred to herein, the terms "media asset" and "content" may be understood to mean electronically consumable user assets, such as 3D content, television programming, as well as pay-per-view programs, on-demand programs (as in video-on-demand (VOD) systems), live content, Internet content (e.g., streaming content, downloadable content, Webcasts, etc.), video clips, audio, content information, pictures, GIFs, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by user equipment, and/or can be part of a live performance. In some embodiments, the media asset may be generated for display from a broadcast or stream received at user equipment 104, or from a recording stored in a memory of user equipment and/or a remote server.

In some embodiments, the media application may be installed at or otherwise provided to a particular computing device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

Figure 1B:
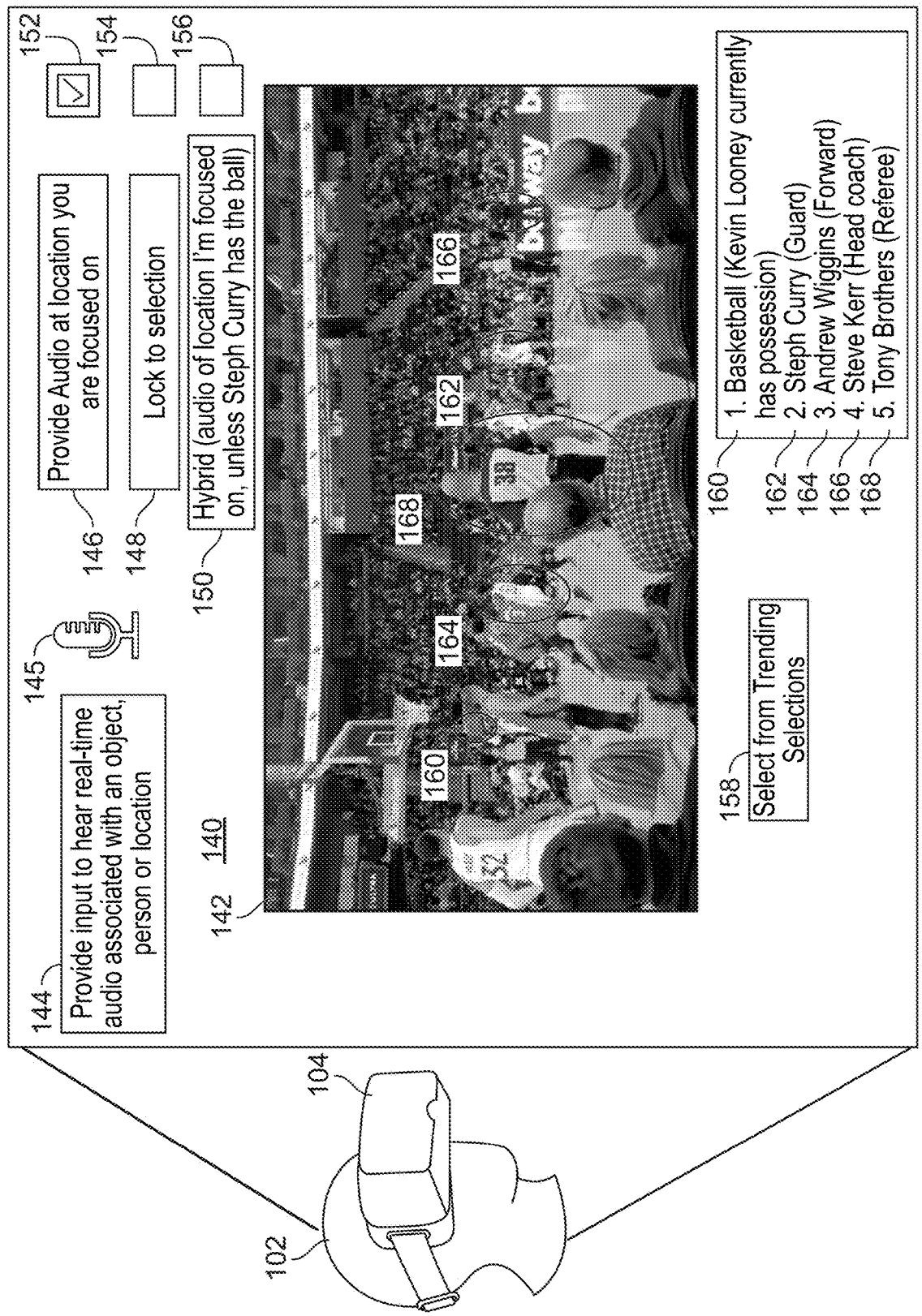
FIG. 1B shows an illustrative scenario for providing audio from a live event to a user in attendance at the live event, in accordance with some embodiments of this disclosure.

FIG. 1B shows an illustrative scenario for providing audio from a live event to a user in attendance at the live event, in accordance with some embodiments of this disclosure. As shown in FIG. 1B, the media application may cause user equipment 104 to generate for display user interface 140. In some embodiments, such as if user equipment 104 corresponds to an AR device, portion 142 of user interface 140 may correspond to the real-world live event (e.g., as seen though AR glasses) from the seat of user 102, where other fans may be visible in front of user 102. In some embodiments, portion 142 of user interface 140 may correspond to one or more video streams of the live event (e.g., as captured by cameras 131, 132, 134 and/or 136, and/or provided by a broadcaster of the live event).

User interface 140 may comprise an indication 144 prompting a user to provide input specifying one or more objects, persons or locations associated with the live event for which user 102 is interested in being provided real-time audio of. Input may be received in any suitable form, e.g., as voice input, tactile input, input received via a keyboard or remote, input received via a touchscreen, text-based input, biometric input, or any other suitable input, or any combination thereof. User interface 140 may comprise options 146, 148 and 150 (corresponding to selection options 152, 154 and 156, respectively) to enable user 102 to specify how user inputs should be used to provide audio of the live event to user 102. In some embodiments, user interface 140 may be provided via a smartphone of user 102. In some embodiments, user interface 140 may be provided as an overlay over portion 142.

Options 152, 154 and/or 156 may be used to specify one or more portions of interest, or hotspots, in which a user is interested in current audio associated therewith. For example, if option 152 is selected by user 102 to indicate option 146 is desired to be implemented, the media application may continuously provide to user 102 audio from one or more microphones 106 . . . 130 in a vicinity of a location that user 102 is currently focused on. In some embodiments, to determine the location that user 102 at the live event is currently focused on, the media application may utilize one or more sensors (e.g., in user equipment 104) to track one or both eyes of a user, to determine a portion of live event at which the user's gaze is directed or is focused. In some embodiments, the user's gaze may be considered to be user input that is received via a user interface. Additionally, or alternatively, to determine the location that user 102 at the live event is currently focused on, the media application may utilize one or more sensors (e.g., in user equipment 104, such as, for example, a geomagnetic field sensor and/or an accelerometer and/or any other suitable sensor) to determine an orientation of user equipment 104 in relation to the live event. In some embodiments, the media application may have access to a seat number of the user (e.g., inferred based on user input, or based on referencing an email or electronic ticket stored on user equipment 104 or another device, or based on an identifier of user equipment 104) and may determine the location of user 102 at the live event based at least in part on the location and/or orientation of such seat number and/or based on a GPS signal or other positioning indication from user equipment 104. In some embodiments, the options of user interface 140 may be provided to the user to request user input in the event that the location and/or orientation of user 102 (e.g., which may be determined at least part on the user's gaze) are unclear or unable to be determined at a current time.

In some embodiments, the microphones used to provide audio to the user may be modified each time the gaze of user 102 shifts to a new location. Alternatively, the media application may wait for a threshold period of time (e.g., 5 seconds) before modifying the microphones being used to capture audio for user 102, to avoid modifying the audio if the user is tying his or her shoe or talking to a friend and temporarily shifts his or her gaze.

As another example, if option 154 is selected by user 102 to indicate option 148 is desired to be implemented, the media application may continuously provide to user 102 audio from one or more microphones 106 . . . 130 in a vicinity of a location that is selected by user 102. For example, if the live event is a basketball game in which the Los Angeles Lakers are competing against the Golden State Warriors, the media application may receive, via a microphone of user equipment 104, voice input of "I want to hear audio of Lebron James," and based on such input, may track a location of Lebron James at the live event, and provide audio from microphones in a vicinity of Lebron James at each tracked location. As another example, user interface 140 may receive input (e.g., via touch screen of user equipment 104) selecting an object (e.g., the basketball) being interacted with by performers (e.g., athletes and/or referees) on the basketball court, may track a location of the basketball at the live event, and may provide audio from microphones in a vicinity of the basketball at each tracked location. In some embodiments, the media application may receive selection of one or more particular locations on the court (e.g., under the basket, at the three point line, or any other suitable location) indicating that the user 102 desires to hear current audio at such location(s). In some embodiments, the media application may permit user 102 to drag and drop, or otherwise associate, microphone icon 145 at or with any suitable location of the basketball court shown via portion 142, to select a portion of the live event for which associated audio should be provided to the user.

In some embodiments, a portion 158 of user interface 140 may provide user 102 with information regarding trending selections. For example, the media application may automatically identify a plurality of portions of interest or hotspots using any suitable technique. For example, the trending selections may be based on most selected objects or persons during the current live event, most selected objects or persons historically by user 102 and/or other users, most mentioned objects or persons on social media, interests indicated in a user profile of user 102, or any other suitable criterion, or any combination thereof. In some embodiments, portion 142 of user interface 140 may provide annotations or indications corresponding to, and tracking movement of, the trending selections. For example, annotation 160 may indicate the current location of, and track the location of, the basketball being used by the athletes to play the basketball game (and indicate that the athlete Kevin Looney of the Golden State Warriors currently has possession of the basketball); annotation 162 may indicate the current location of, and track the location of, the athlete Steph Curry of the Golden State Warriors; annotation 164 may indicate the current location of, and track the location of, the athlete Andrew Wiggins of the Golden State Warriors; annotation 166 may indicate the current location of, and track the location of, the head coach Steve Kerr of the Golden State Warriors; and annotation 168 may indicate the current location of, and track the location of, the NBA referee Tony Brothers. The media application may enable user 102 to select one or more of the trending selections as his or her selection for which audio should be provided to user 102 from microphones in a vicinity of the selected trending object. In some embodiments, user interface 140 may provide, in association with the trending selections, a chat over which users may indicate which trending selections are currently of interest to them, and recommendations may be provided to the user based on the chat content.

Any suitable technique may be used to identify and track objects or persons at the live event. For example, the media application may employ machine learning and/or heuristic techniques in real time to identify the athlete Steph Curry, and track his movements across frames of one or more video streams of the live event. In some embodiments, an image thresholding technique, an image segmentation technique, a computer vision technique, an image processing technique, or any other suitable technique, or any combination thereof may be used to identify one or more objects across frames of the one or more video streams. In some embodiments, the image processing system may utilize one or more machine learning models (e.g., naive Bayes algorithm, logistic regression, recurrent neural network, convolutional neural network (CNN), bi-directional long short-term memory recurrent neural network model (LSTM-RNN), or any other suitable model, or any combination thereof) to localize and/or classify objects in a given image.

In some embodiments, option 150 may allow user 102 to select a hybrid option incorporating elements of options 146 and 148. For example, option 150 may indicate that the media application should provide to user 102 audio from one or more microphones 106 . . . 130 in a vicinity of a location that user 102 is currently focused on or gazing at, unless Steph Curry is determined to have possession of the basketball, in which case the user's gaze should be disregarded and audio from microphone(s) in a vicinity of Steph Curry having the basketball should be provided.

In some embodiments, the media application may identify hotspots or persons or objects of interest at the live event without explicit user input. For example, the media application (e.g., which may be provided by an owner of the venue or broadcast provider providing the live event on television) may compare audio signals captured by microphones 106, 108, 110, 112, 114, 116, 118, 120, 122, 124, 126, 128, 130 . . . n to each other and/or to certain threshold(s). Based on such comparison(s), the media application may determine if particular microphones have more, or significantly more, activity as compared to other microphones (e.g., in terms of volume, quality, signal to noise ratio, fidelity, specific words or other audio being captured, or any other suitable characteristics, or any combination thereof), and may cause such particular microphones to be recommended or used as a hotspot, to direct user's attention to hotspots corresponding to such microphones.

Figure 2:
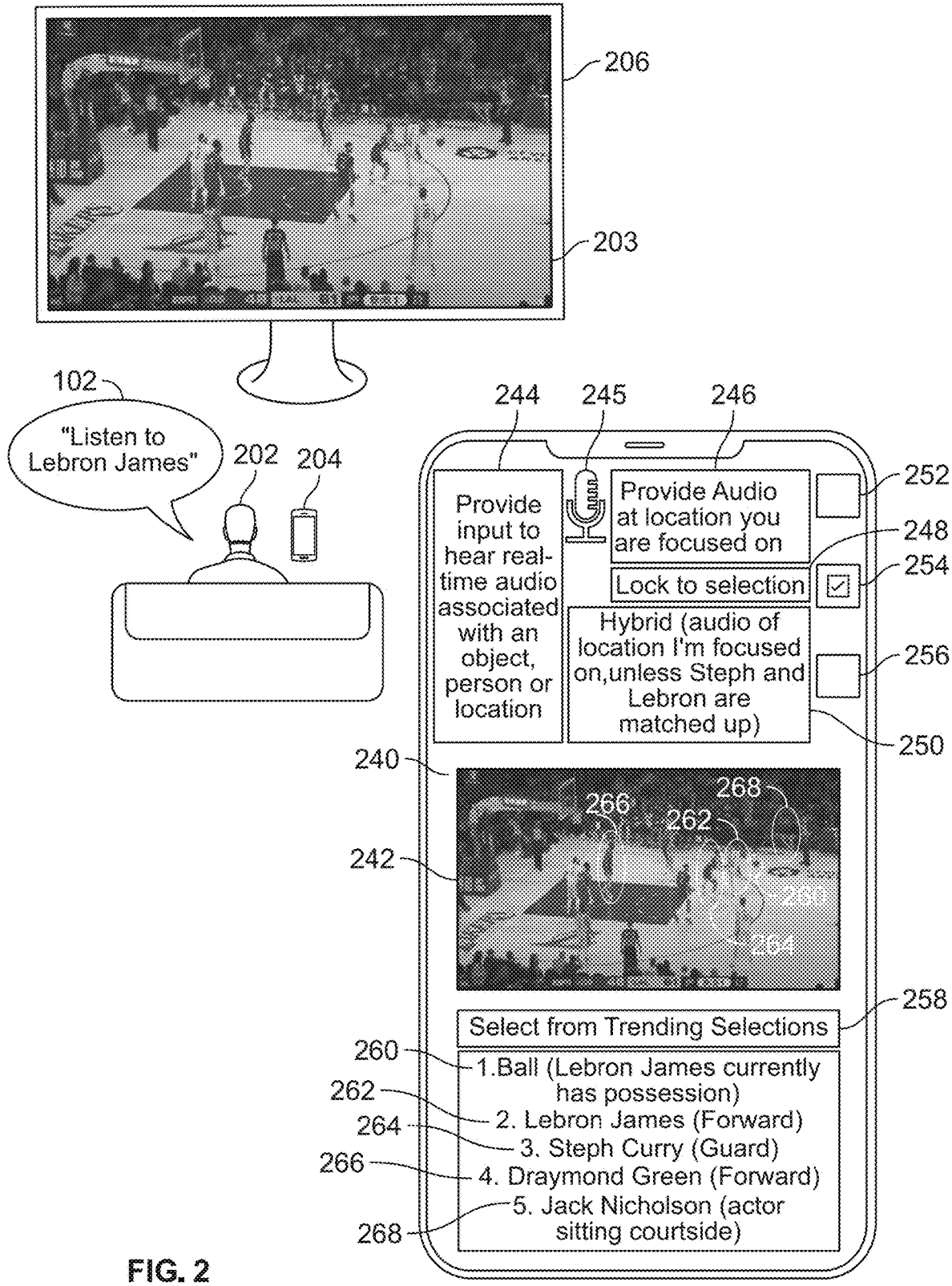
FIG. 2 shows an illustrative scenario for providing audio from a live event to a user not in attendance at the live event, in accordance with some embodiments of this disclosure.

FIG. 2 shows an illustrative scenario for providing audio from a live event to a user not in attendance at the live event, in accordance with some embodiments of this disclosure. User 202 may be, for example, at his or her home or any other suitable location other than in attendance at the live event, and a media asset 203 (e.g., one or more of the video streams) of the live event may be being provided to user 202 via user equipment 206 (e.g., a television or a smartphone or any other suitable user equipment) by way of the media application or other suitable application. User equipment 204 associated with user 202 may correspond to user equipment 104 of FIGS. 1A-1B. The media application may provide user interface 240 at user equipment 204 and/or user equipment 206. User interface 240 may be similar to user interface 140 of FIG. 1B. Portion 242 may correspond to the one or more live video streams of the live event (e.g., being shown at user equipment 206), indication 244 may correspond to indication 144, and options 246, 248, 250, 252, 254 and 256 may correspond to options 146, 148, 150, 152, 154 and 156, respectively. Options 252, 254 and/or 256 may be used to specify one or more portions of interest, or hotspots, in which a user is interested in current audio associated therewith. For option 256, similar techniques may be used to determine a location that user 102 is currently focused on, as described in relation to option 156 of FIG. 1B.

In the example of option 250, the hotspot may be determined to be a portion of the live event the user is gazing at, except if a specific condition is met (e.g., if Steph Curry is guarding Lebron, or Lebron is guarding Steph Curry), in which case audio associated with that specific condition may be provided to the user. In some embodiments, the specific condition indicated in option 150 or 250 may be predefined conditions, conditions input by the user, popular conditions used by the current user or other users, or may be determined using any other suitable criteria, or any combination thereof. In some embodiments, the condition of option 250 may correspond to "if the basketball is in play, provide audio at location of basketball; if not, provide audio of location I am looking at."

In some embodiments, portion 242 of user interface 240 may provide annotations or indications corresponding to, and tracking movement of, the trending selections 258, which may be determined using the same or similar criteria discussed in relation to trending selection 158. For example, annotation 260 may indicate the current location of, and track the location of, the basketball being used by the athletes to play the basketball game (and indicate that the athlete Lebron James of the Los Angeles Lakers currently has possession of the basketball); annotation 262 may indicate the current location of, and track the location of, the athlete Lebron James; annotation 264 may indicate the current location of, and track the location of, the athlete Steph Curry; annotation 266 may indicate the current location of, and track the location of, athlete Draymond Green of the Golden State Warriors; and annotation 268 may indicate the current location of, and track the location of, the actor Jack Nicholson (sitting courtside as a fan viewing the live event). The media application may enable user 202 to select one or more of the trending selections as his or her selection for which audio should be provided to user 202 from microphones in a vicinity of the selected trending object.

In some embodiments, in the examples of FIGS. 1A-1B and FIG. 2, the media application may determine that user input (e.g., which portion of the live event the user is gazing at, or which portion of the live event is referenced in a voice command) is ambiguous as to which hotspot a user is requesting to hear audio for. In such a circumstance, the media application may identify a closest matching hotspot to the user input. For example, if a current user gaze is determined to be at midcourt, but no players are at midcourt, the hotspot may be determined to be at 262 (Lebron James dribbling the basketball) which is a nearest candidate hotspot to the midcourt area from among a plurality of candidate portions of interest (e.g., from popular selections 260-268, which may be determined at least in part from analyzing one or more live video streams of the live event, and/or based on past user selections). As another example, if user input is received indicating "Play audio for the best player" the media application may compare such input to metadata for each player on the court (and/or the bench), and/or reference a ranking or other content related to a list of the players in the NBA, to identify a best player on the court (e.g., Lebron James), and thus may provide audio to the user associated with Lebron James at various locations (e.g., playing in the game and/or sitting on the bench).

Figure 3:
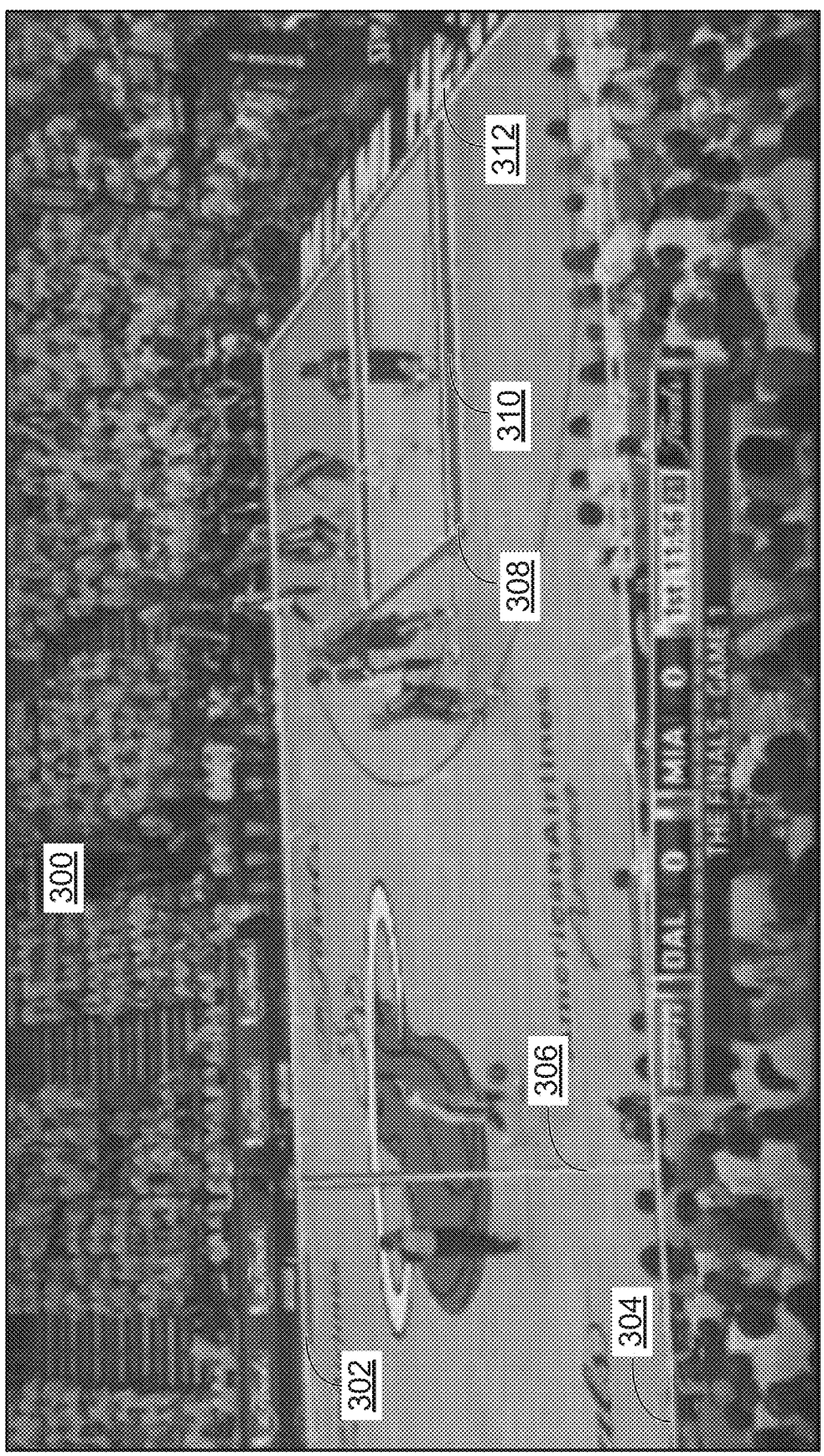
FIG. 3 shows an illustrative example of mapping portions of interest to a map of a live event, in accordance with some embodiments of this disclosure.

FIG. 3 shows an illustrative example of mapping portions of interest to a map 300 of a live event, in accordance with some embodiments of this disclosure. The media application may map the detected hotspots or portions of interest in the live event to a two-dimensional (2D) map 300 of the live event (e.g., a professional basketball game at a basketball arena). For example, as shown in FIG. 3, the media application may detect, and/or align to 2D map 300 of the live event, basketball court boundaries detected in the one or more video streams, such as, for example, sideline out of bounds lines 302 and 304; foul line 308, paint lines 310, baseline 312 and/or any other suitable boundaries (e.g., three point lines) to 2D map 300 of the live event, and determine the locations of the hotspots relative to such court, and map such hotspots to their corresponding locations in 2D map 300.

In some embodiments, basketball court boundaries, and objects or persons performing on the court or in a vicinity thereof, may be mapped to a Cartesian coordinate plane (or any other suitable coordinate plane), with the position recorded as (X, Y) coordinates on the plane. In some embodiments, the coordinates may include a coordinate in the Z-axis, to identify a depth of each identified object in 3D space, based on images captured using 3D sensors and any other suitable depth-sensing technology. As an example, the media application may specify that an origin of the coordinate system is considered to be at midcourt, or at any other suitable portion of the live event. In some embodiments, such coordinate system may include indications of locations of the microphones, as well as particular objects, persons, structures or other entities at the live event. For example, each microphone at the live event may be associated with a fixed location (e.g., if installed on a portion of the backboard) at the live event, or a dynamic location (e.g., if attached to a player's jersey), at the live event, which may be updated over time, and the static or dynamic location of such microphones may be stored at a data structure (e.g., at storage 608 of FIG. 6, and/or storage 717 and/or database 705 of FIG. 7). Such microphone locations may be referenced and compared to fixed or dynamic locations of objects and/or persons at the live event (which may also be stored at the data structure), to identify the microphones(s) that should be used to provide audio to a user.

In some embodiments, an image thresholding technique, an image segmentation technique, a computer vision technique, an image processing technique, or any other suitable technique, or any combination thereof may be used to identify one or more boundaries, persons or objects across frames of the one or more video streams. In some embodiments, the image processing system may utilize one or more machine learning models (e.g., naive Bayes algorithm, logistic regression, recurrent neural network, convolutional neural network (CNN), bi-directional long short-term memory recurrent neural network model (LSTM-RNN), or any other suitable model, or any combination thereof) to localize and/or classify boundaries, persons or objects in a given image or frame of the one or more video streams of the live event.

Figure 4:
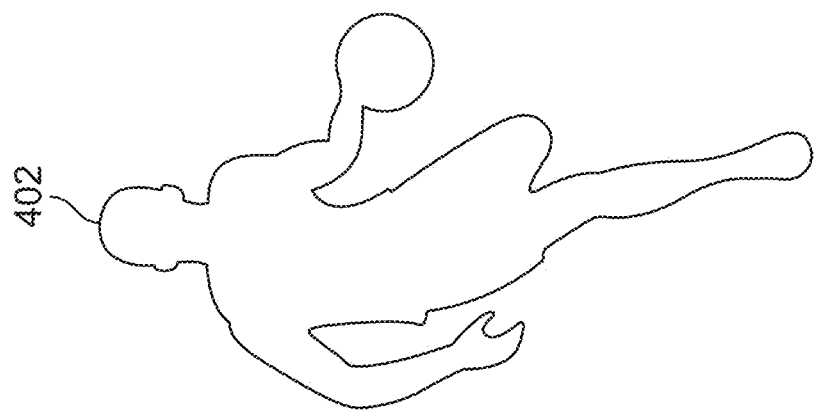
FIG. 4 shows an illustrative technique for identifying one or more microphones for capturing audio associated with a particular portion of interest or hotspot, in accordance with some embodiments of this disclosure.
Figure 4:
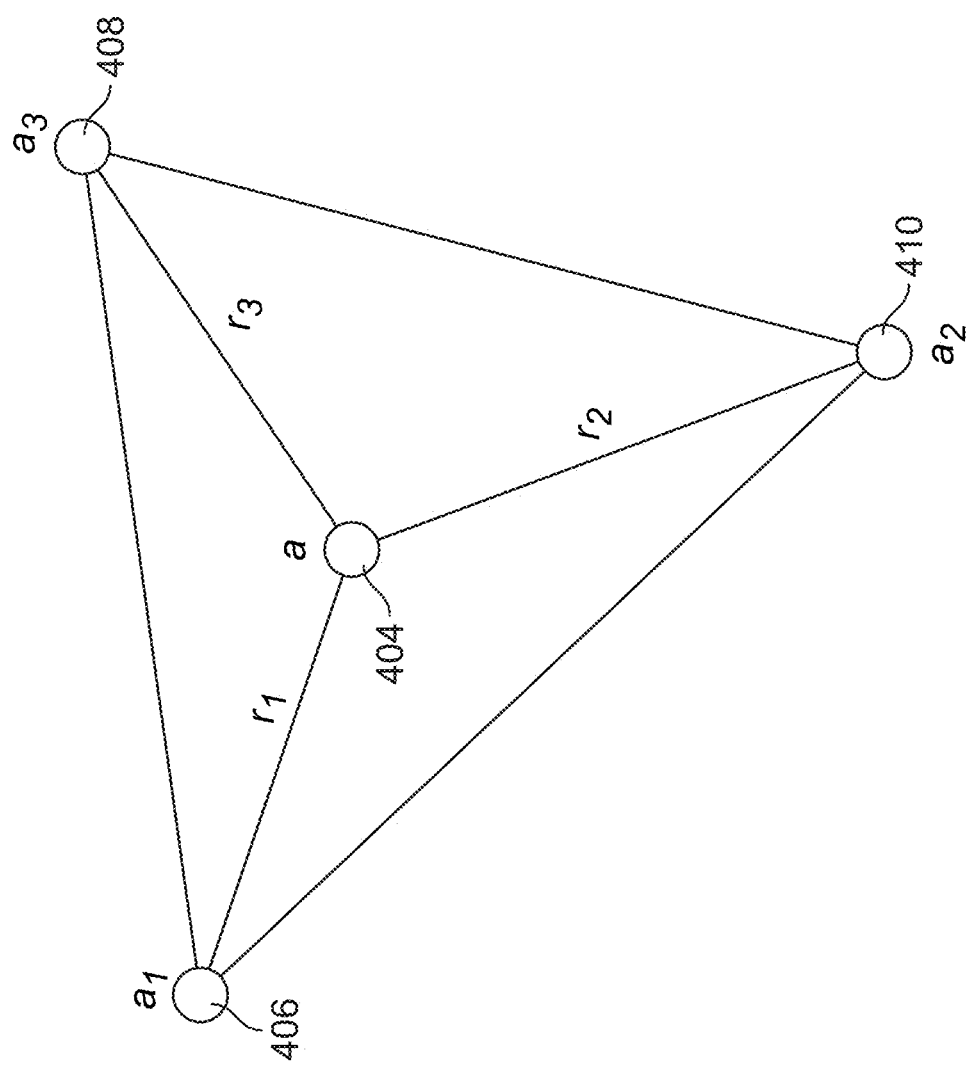

FIG. 4 shows an illustrative technique for identifying one or more microphones at the live event for capturing audio associated with a particular portion of interest or hotspot, in accordance with some embodiments of this disclosure. In the example of FIG. 4, a portion of interest or hotspot may correspond to, for example, a particular athlete 402 (e.g., Lebron James) or any other suitable portion of interest in the live event, and may be determined based on the techniques described herein, e.g., in relation to FIGS. 1A-1B, 2 and/or FIG. 3. In some embodiments, the media application may identify, as the microphone(s) for which its audio is to be obtained for the portion of interest and provided to the user (e.g., user 102 of FIGS. 1A-1B), a closest microphone to athlete 402 dribbling a basketball, which may correspond to the portion of interest or hotspot.

As another example, the media application may identify, as the microphone(s) for which its audio is to be obtained for the portion of interest and provided to the user (e.g., user 102 of FIGS. 1A-1B), a closest predefined (or dynamically determined) number of microphones (e.g., 3 or any other suitable number) relative to portion of interest 402, using any suitable technique. For example, the media application may implement a Delaunay triangulation algorithm to partition the set of microphone locations 106 . . . 130 of FIG. 1A into triangles so that each location at the live event (e.g., on the basketball court of FIG. 1A) is associated with a particular triangle, where microphones (e.g., installed under the basketball court, or at any other suitable location) may each be placed at a particular vertex of a particular triangle. In the example of FIG. 4, point 404 (a) may correspond to the portion of interest or hotspot (e.g., athlete 402), and points 406, 408 and 410 may correspond to vertices of a triangle. Points 406, 408 and 410 may correspond to locations of respective microphones $a_1$, $a_2$, $a_3$ at the live event (e.g., installed under the basketball court, or at any other suitable location), where the distances of $a_1$, $a_2$, $a_3$ from portion of interest 404 (a) are $r_1$, $r_2$, $r_3$, respectively, and the sound or audio at portion of interest 404 (a) can be interpolated as shown in equation (1) as:

(1)

$$a = \frac{\frac{a_1}{r_1} + \frac{a_2}{r_2} + \frac{a_3}{r_3}}{\frac{1}{r_1} + \frac{1}{r_2} + \frac{1}{r_3}}$$

Such aspects may enable the media application to selectively perform selection of microphones in a manner that is highly personalized to each user (e.g., based on user input detected by user equipment 104 of FIG. 1A), by providing each user a weighted combination of synthesized microphone signals of a microphone array corresponding to audio of a particular portion of interest or hotspot. It should be noted that while equation (1) is provided herein and described for the purposes of illustration, the media application may employ any suitable audio signal processing or audio interpolation technique, e.g., linear interpolation, non-linear interpolation, cubic interpolation, radial basis function interpolation. In some embodiments, an audio interpolation may be separately or collectively applied to each sound source relevant to providing audio at the portion of interest or hotspot.

FIGS. 5A-5D shows an illustrative scenario for providing audio from a live event to a user, in accordance with some embodiments of this disclosure. User 502 may be using, wearing and/or associated with user equipment 504, which may correspond to user equipment 104 of FIGS. 1A-1B and/or user equipment 204 and/or 206 of FIG. 2. In some embodiments, user equipment 504 may comprise or correspond to headphones capable of playing audio to a user. In some embodiments, user 502 may be in attendance at the live event (e.g., a professional basketball game, or any other suitable live event) and may be sitting at, or otherwise present at, seat 505 of the venue 500 (e.g., a basketball arena). Venue 500 may comprise a microphone array 506 of microphones at various locations around the basketball court or any other suitable portion of the arena, and/or venue 500 may correspond to arena 100 having a plurality of microphones 106, 108, 110, 112, 114, 116, 118, 120, 122, 124, 126, 128, 130 . . . n, at respective locations at the live event. Alternatively, user 502 may not be present at the live event, e.g., user 502 may be viewing a stream or broadcast of the live event from his or her home or other location.

In some embodiments, seat 505 may be a seat that is in the "nose bleeds," towards the back of the basketball stadium, or any other location, e.g., at a location that is farther away from the performance of the live event than other seats, such as, for example, VIP seats 508, 510, 512, 514, 516. User 502 may not have physical access to such VIP seats 508-516. For example, tickets for such VIP seats 508-516 may be much more expensive than tickets for seat 505, such that user 502 may not be able to reasonably afford purchasing tickets for the VIP seats, and/or such VIP seats may be already booked for the season, e.g., by a corporate entity that buys season tickets. However, the media application may enable user 502 to be provided with audio that replicates the audio experience at one or more of such VIP seats, and/or another different location at the live event.

In some embodiments, the media application may determine which VIP seat's audio a user 502 is interested in by identifying a desired perspective of user 502 (e.g., courtside on the closest sideline, midcourt, a skybox, a current gaze location of user 502, or any other suitable perspective, or any combination thereof). The media application may make this determination based on explicit user input and/or based on inferring a desired perspective (e.g., based on user input such as, for example, audio input or gaze input). For example, the media application may determine that VIP seat 514 matches a viewing perspective of user 502, and the media application may identify one or more microphones (e.g., from microphone array 506) in a vicinity of VIP seat 514, and provide audio from such one or more microphones to user 502.

In some embodiments, the media application may enable user 502 to perceive the same sound effect as if he or she is in one of the VIP seats 508-516 by reconstructing an audio field that can render spatial audio to the audience's ears, e.g., using microphones of microphone array 506 installed around (and/or on or otherwise associated with) the basketball court. In some embodiments, the media application may map a member of the audience in the back of arena 500 (or any other suitable portion of arena 500), such as user 502, to one of the VIP front seats according to a user's determined focus spot and viewing direction.

Figure 5A:
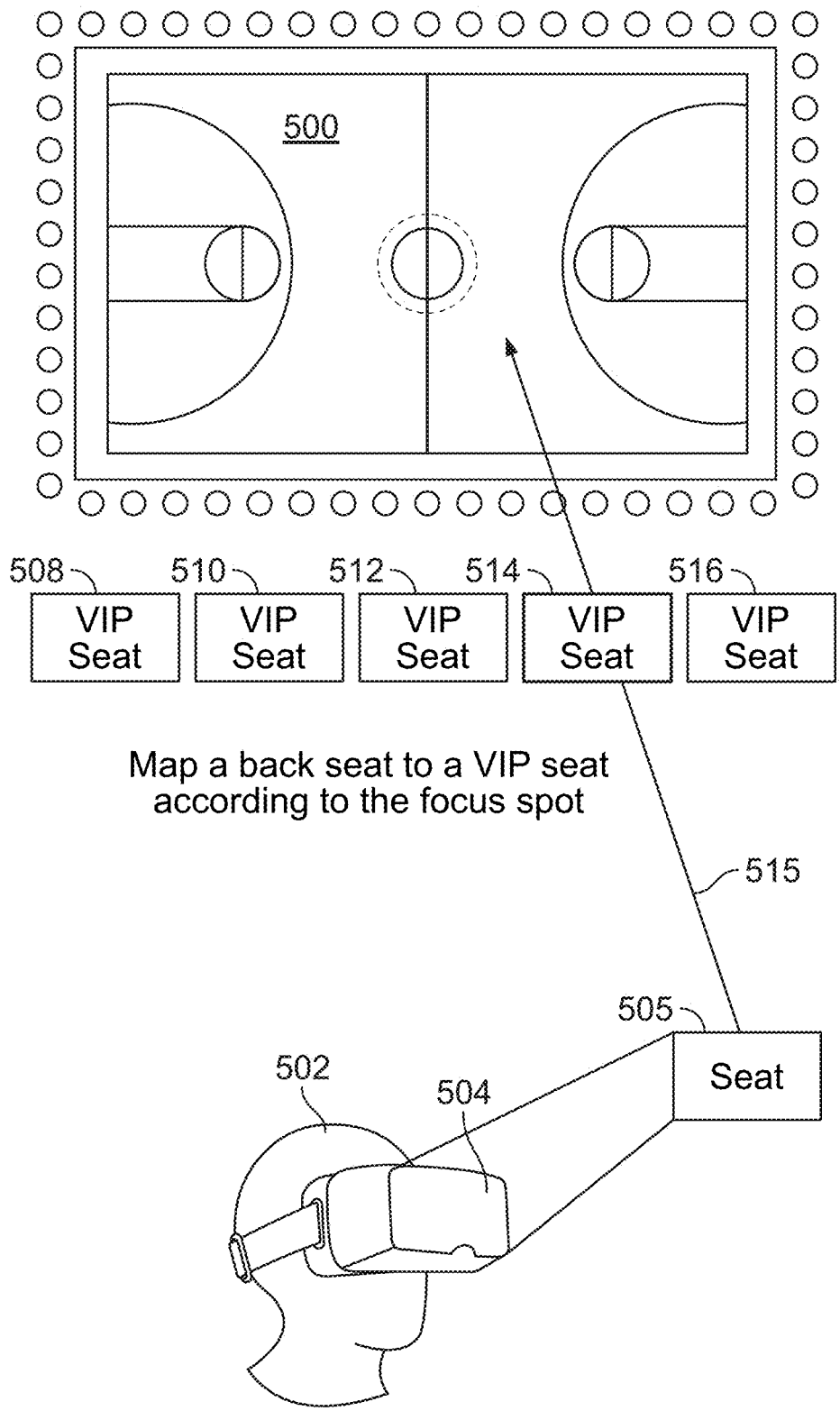
Figure 5B:
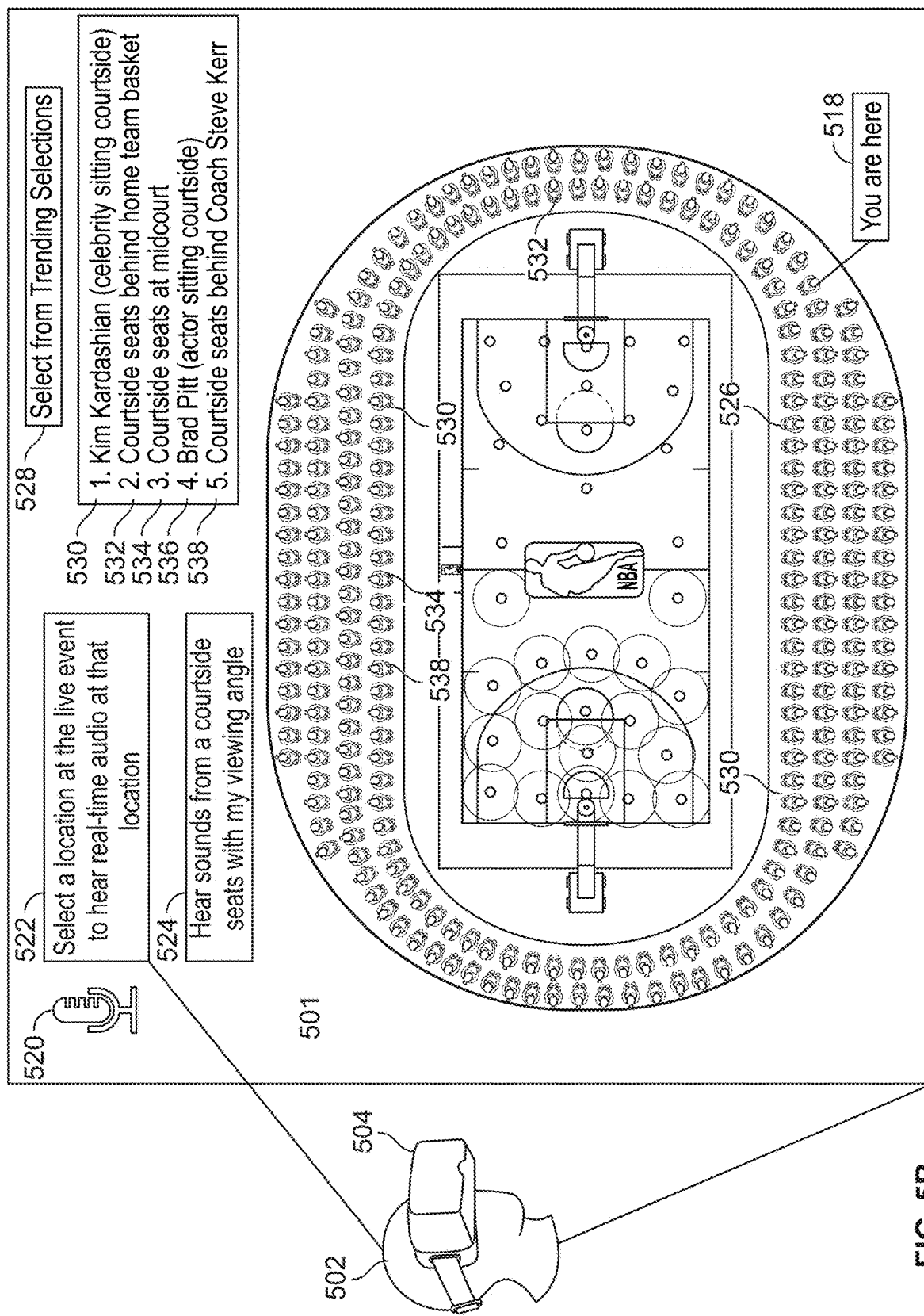

As shown in FIG. 5B, the media application may provide user interface 501 to enable user 502 to specify a seat or other portion of arena 500 that user 502 is interested in audio at. User interface 501 may comprise a representation of venue 500 including a seating map of various seats in the venue 500. Indication 518 may notify a user where his or her current seat is in the arena, e.g., based on a GPS signal or other positioning indication from user equipment 504, and/or based on a seat number of user 502 (e.g., inferred based on user input or based on referencing an email or electronic ticket stored on user equipment 504 or another device, or based on an identifier of user equipment 504). Alternatively, if user 502 is determined by the media application not to be present in the arena, indication 518 may not be present, or may indicate that user 502 is not in the arena. In some embodiments, selection of a seat at user is interested in may additionally or alternatively be based on other user input (e.g., a particular seat a user is determined to be gazing at).

User interface 501 may comprise indication 522 prompting user 502 to select a location at the live event (e.g., a particular VIP seat) that he or she is interested in the audio of. For example, user interface 501 may enable user 502 to drag and drop microphone icon 520 to, or otherwise specify a selection of, a portion (e.g., a seat) of a representation of venue 500. As another example, user interface 501 may comprise option 524 to instruct the media application to identify an optimal VIP seat (e.g., seat 526) corresponding to the user's particular viewing angle (e.g., determined based on a gaze of user 502). The portion of interest may be identified automatically (e.g., without user input) or manually or semi-manually (e.g., in a manner responsive to user input).

In some embodiments, a portion 528 of user interface 140 may provide user 502 with information regarding trending selections. For example, the media application may automatically identify a plurality of portions of interest or hotspots using any suitable technique. For example, the trending selections may be based on most-selected portions (e.g., seats) of venue 500 during the current live event, most selected portions (e.g., seats) historically by user 502 and/or other users, most mentioned seats or portions of venue 500 on social media, interests indicated in a user profile of user 502, or any other suitable criterion, or any combination thereof. In some embodiments, portion 528 of user interface 501 may provide annotations or indications corresponding to the trending portions of venue 500. For example, annotation 530 may indicate the location of a particular celebrity (e.g., Kim Kardashian) sitting courtside; annotation 534 may indicate the location of courtside seats at midcourt; annotation 536 may indicate the location of a particular actor (e.g., Brad Pitt) sitting courtside; and annotation 538 may indicate the location of a particular seat behind (and within earshot of) Golden State Warriors head coach Steve Kerr, whose team may be competing in the live event. In some embodiments, trending selections may include, or a user may otherwise select, a spot on a team's bench (e.g., occupied by a coach or member of the team) for which the user is to be provided audio from. The media application may enable user 102 to select one or more of the trending selections as his or her selection for which audio should be provided to user 102 from microphones in a vicinity of the selection.

Figure 5C:
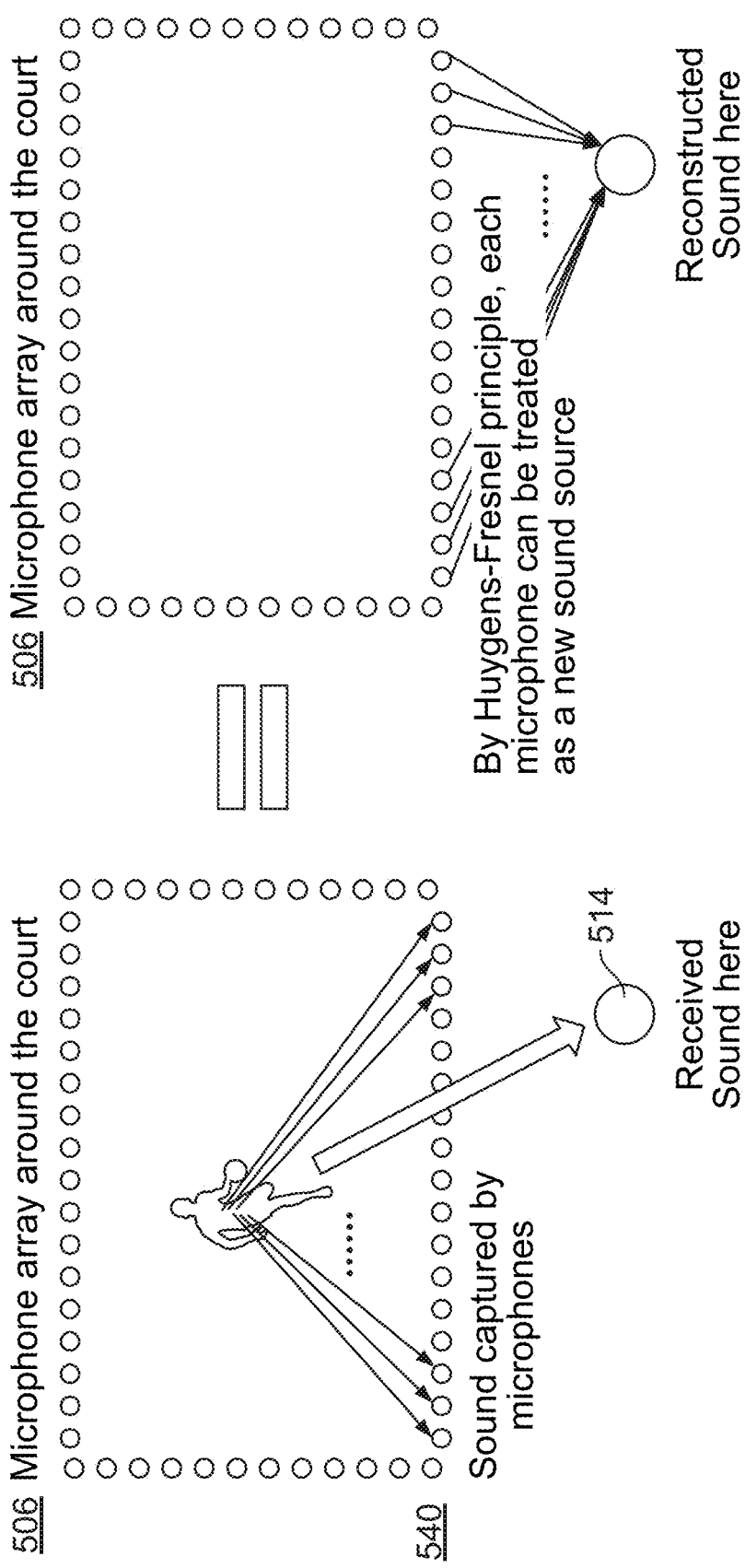

As shown in FIG. 5C, in some embodiments, to reconstruct the perceived spatial sound at the corresponding VIP seat (e.g., VIP seat 514 of FIG. 5A or VIP seat 526 of FIG. 5B) to user 502 (e.g., at seat 505 of FIG. 5A), the media application may apply the Huygens-Fresnel principle, or any other suitable technique. For example, the sound received at VIP seat 514 may be captured by microphones of microphone array 506, and the media application may reconstruct such received sound by treating each of such microphones as a new sound source, e.g., replacing the original sound sources with an array of virtual sound sources in front of (or otherwise adjacent to or in a vicinity of) the VIP seat 514, where each virtual sound source may play the captured sound by each corresponding microphone.

The media application may have access to each microphone's location (e.g., stored in a data structure), as well as the VIP Seat's location (e.g., stored in a data structure) and the orientation of user 502 (e.g., inferred by a gaze of the user associated with user equipment 504 and/or based on other suitable input). Based on such data, the sound at the VIP seat can be synthesized and simulated (e.g., to user 502 at seat 505, as if user 502 was seated at the VIP seat) using the user's personal HRTF (Head-related transfer function). More specifically, as shown in FIG. 5D and in equation (2) below, the sound at the VIP seat may correspond to:

(2)

$$A = \sum_{i=1}^{n} \frac{HRTF(\theta_i)}{r_i^2} A_i$$

where $A_i$ is the captured sound at the i-th microphone; $\theta_i$ is the angle between a viewing direction 515 from VIP seat and the i-th microphone location; $r_i$ is the distance between the VIP seat and a particular microphone of microphone array 506. In some embodiments, equation (2) may be used to perform calculations in the frequency domain. For example, at each of a plurality of frequencies, equation (2) may be applied with respect to the user's HRTF for a particular frequency at a given angle, and the resulting composition may be converted from the frequency to the time domain, which may be the waveform output from the user equipment (e.g., which may comprise or correspond to headphones). Such aspects may be used to accumulate signals from each relevant microphone as a virtual sound source and then sum such signals for filtering by the transfer function, to enable user 502 to perceive the audio experience at VIP seat 514. FIGS. 5A-5D may enable suitable microphone(s) to be identified, to enable a user to be provided with audio that replicates the audio experience at a different location at the live event (e.g., a different seat in an arena than the user's seat, such as, for example, a front row seat).

In some embodiments, it may be desirable to filter audio to be provided to the user (e.g., and/or disable certain microphones at certain times) in one or more of the examples of FIGS. 1A-FIG. 5D for one or more of a variety of reasons. For example, for privacy reasons, it may be desirable to provide less than all audio uttered by a player, coach, referee or fan (e.g., a celebrity) to a user. For example, if a coach is determined by the media application to be discussing tactical strategy related to the basketball game or live event, or fans at VIP seats are determined to be having business discussions, it may be desirable to modify or remove this audio from an audio feed provided to users by the media application. As another example, to avoid providing objectionable content (e.g., profane or inappropriate language) to users, it may be desirable to provide less than all audio uttered by a player, coach, referee or fan (e.g., a celebrity) to a user. The media application may manually and/or using computer-implemented techniques identify such portions of audio to be modified, and mute or remove such audio portions from the audio feed, or replace such audio portions with other audio (e.g., shifting to another location in the live event, shift to commentary provided by announcers in a video or audio stream of the live event, shift to an advertisement or interactive content, or perform any other suitable action, or any combination thereof). In some embodiments, such modification of audio (and/or disabling of certain microphones at certain times) may be performed in relation to the team's benches and/or VIP areas. In some embodiments, certain performers, coaches, celebrities or other persons at the live event may be asked to provide their consent to access all of their audio or certain permitted topics of their audio.

In some embodiments, a machine learning model (e.g., a neural network) may be trained (with labeled training examples) to identify certain types of audio portions (e.g., comprising objectionable content or private conversations or tactical conversations), to determine whether a current audio should be modified or removed from an audio feed provided to users of the media application. Neural networks are discussed in more detail in connection with U.S. Patent Application Publication No. US 2017/0161772 A1 to Xu et al., published Jun. 8, 2017, and US 2020/0183773 A1 to Brehm, published Jun. 11, 2020, the disclosures of each of which is hereby incorporated by reference herein in their entirety.

In some embodiments, the audio signal rendered to a user (e.g., user 102 of FIG. 1A or user 502 of FIG. 5A) may be merged with supplemental content (e.g., commentary from broadcasters of a video and/or audio stream of the live event, and/or sports betting information, and/or any other suitable content) before being delivered to the audience. For example, the supplemental content may be combined with, or substituted for, certain live audio portions detected by the microphone array of FIG. 1A or FIG. 5A during certain moments (e.g., exciting moments of the game), loud moments of the game (e.g., which may hinder the ability of microphones to detect on-court sounds of players), during times of the game where limited audio is detected by the microphones, or at any other suitable time, or any combination thereof. Such merging of content may be performed automatically or in response to receiving user input or a user request to perform the merging. In some embodiments, the sports betting information may be tailored for engagement with, and/or designed only for, the audience present at the live event. In some embodiments, the generated audio can be mono or stereo, or even spatial immersive audio.

Figure 6:
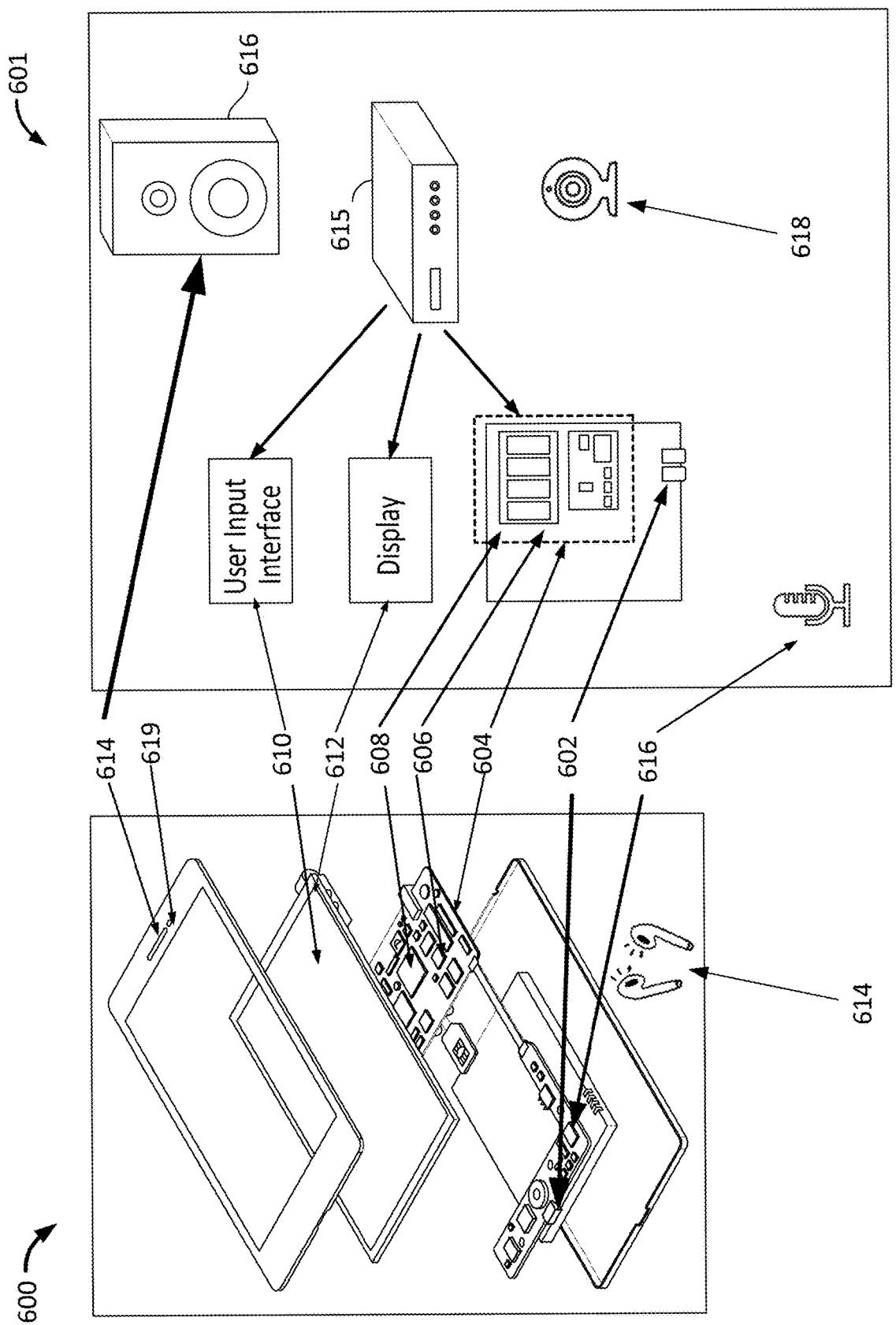
FIGS. 6-7 show illustrative devices and systems for providing audio from a live event to a user, in accordance with some embodiments of this disclosure.
Figure 7:
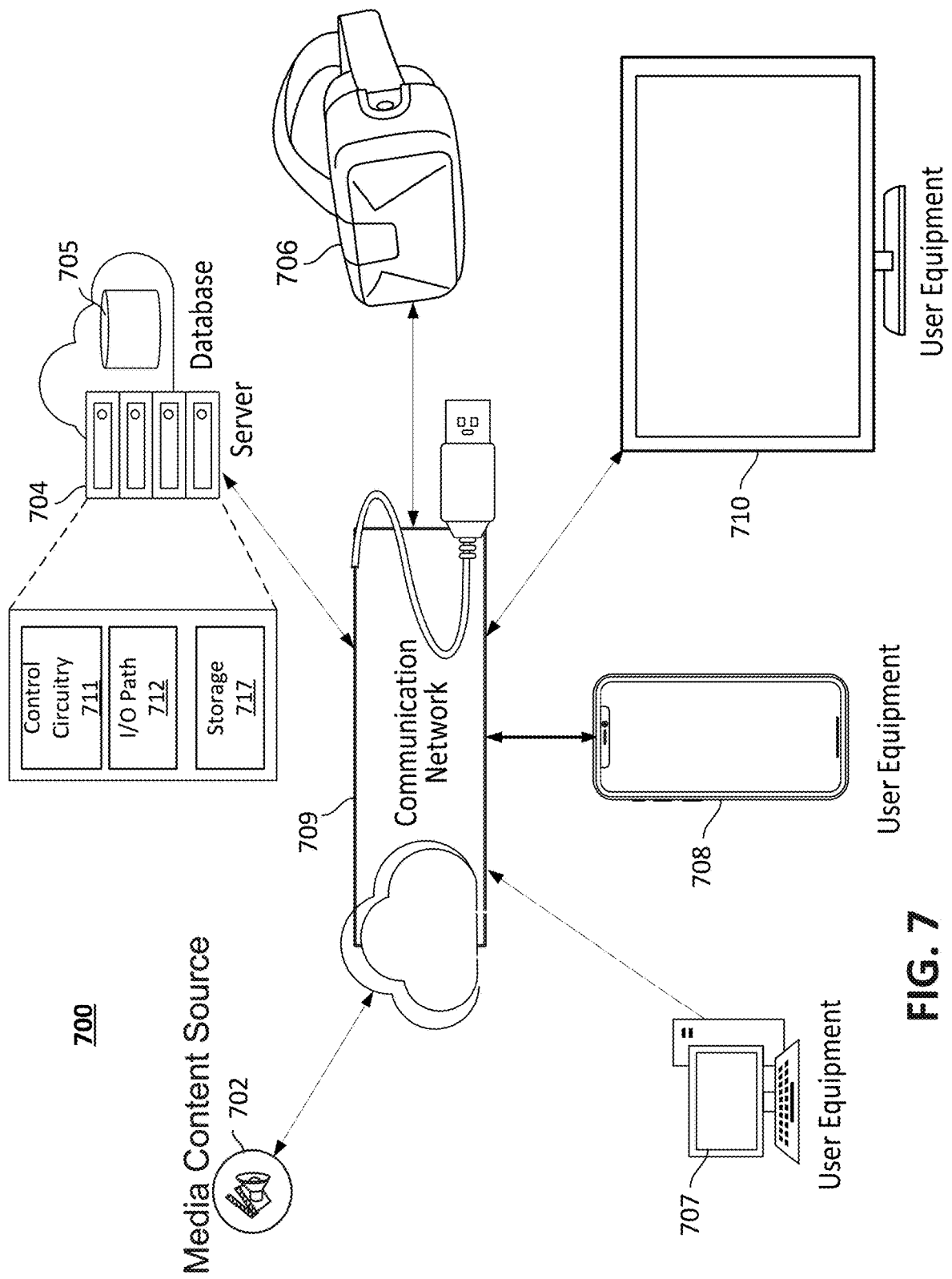

FIGS. 6-7 describe illustrative devices, systems, servers, and related hardware for providing audio from a live event to a user, in accordance with some embodiments of the present disclosure. FIG. 6 shows generalized embodiments of illustrative user equipment 600 and 601, which may correspond to, e.g., user equipment 104 of FIGS. 1A-1B; user equipment 204 of FIG. 2; user equipment 504 of FIGS. 5A-5D. For example, user equipment 600 may be a smartphone device, a tablet, a near-eye display device, an XR device, or any other suitable device capable of participating in a XR environment, e.g., locally or over a communication network. In another example, user equipment 601 may be a user television equipment system or device. User equipment 601 may include set-top box 616. Set-top box 616 may be communicatively connected to microphone 617, audio output equipment (e.g., speaker or headphones 614), and display 612. In some embodiments, microphone 617 may receive audio corresponding to a voice of a video conference participant and/or ambient audio data during a video conference. In some embodiments, display 612 may be a television display or a computer display. In some embodiments, set-top box 616 may be communicatively connected to user input interface 610. In some embodiments, user input interface 610 may be a remote-control device. Set-top box 616 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in connection with FIG. 7. In some embodiments, device 600 may comprise any suitable number of sensors (e.g., gyroscope or gyrometer, or accelerometer, etc.), and/or a GPS module (e.g., in communication with one or more servers and/or cell towers and/or satellites) to ascertain a location of device 600. In some embodiments, device 600 comprises a rechargeable battery that is configured to provide power to the components of the device.

Each one of user equipment 600 and user equipment 601 may receive content and data via input/output (I/O) path 602. I/O path 602 may provide content (e.g., broadcast programming, on-demand programming, internet content, content available over a local area network (LAN) or wide area network (WAN), and/or other content) and data to control circuitry 604, which may comprise processing circuitry 607 and storage 608. Control circuitry 604 may be used to send and receive commands, requests, and other suitable data using I/O path 602, which may comprise I/O circuitry. I/O path 602 may connect control circuitry 604 (and specifically processing circuitry 607) to one or more communications paths (described below). I/O functions may be provided by one or more of these communications paths, but are shown as a single path in FIG. 6 to avoid overcomplicating the drawing. While set-top box 616 is shown in FIG. 6 for illustration, any suitable computing device having processing circuitry, control circuitry, and storage may be used in accordance with the present disclosure. For example, set-top box 616 may be replaced by, or complemented by, a personal computer (e.g., a notebook, a laptop, a desktop), a smartphone (e.g., device 600), an XR device, a tablet, a network-based server hosting a user-accessible client device, a non-user-owned device, any other suitable device, or any combination thereof.

Control circuitry 604 may be based on any suitable control circuitry such as processing circuitry 607. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 604 executes instructions for the media application stored in memory (e.g., storage 608). Specifically, control circuitry 604 may be instructed by the media application to perform the functions discussed above and below. In some implementations, processing or actions performed by control circuitry 604 may be based on instructions received from the media application.

In client/server-based embodiments, control circuitry 604 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 6, the instructions may be stored in storage 608, and executed by control circuitry 604 of a device 600.

In some embodiments, the media application may be a client/server application where only the client application resides on device 600, and a server application resides on an external server (e.g., server 704 and/or media content source 702). For example, the media application may be implemented partially as a client application on control circuitry 604 of device 600 and partially on server 704 as a server application running on control circuitry 711. Server 704 may be a part of a local area network with one or more of devices 600, 601 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 704 and/or an edge computing device), referred to as "the cloud." Device 600 may be a cloud client that relies on the cloud computing capabilities from server 704 to generate personalized engagement options in a VR environment. The client application may instruct control circuitry 604 to generate personalized engagement options in a VR environment.

Control circuitry 604 may include communications circuitry suitable for communicating with a server, edge computing systems and devices, a table or database server, or other networks or servers. The instructions for carrying out the above mentioned functionality may be stored on a server (which is described in more detail in connection with FIG. 7). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 7). In addition, communications circuitry may include circuitry that enables peer-to-peer communication of user equipment, or communication of user equipment in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media application data described above. Nonvolatile memory may also be used (e.g., to launch a boot-up routine and other instructions). Cloud-based storage, described in relation to FIG. 6, may be used to supplement storage 608 or instead of storage 608.

Control circuitry 604 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 604 may also include scaler circuitry for upconverting and downconverting content into the preferred output format of user equipment 600. Control circuitry 604 may also include digital-to-analog converter circuitry and analog-to-digital converter circuitry for converting between digital and analog signals. The tuning and encoding circuitry may be used by user equipment 600, 601 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user equipment 600 and user equipment 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 616.

Audio output equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of device 600 and device 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 617 or audio output equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

The media application may be implemented using any suitable architecture. For example, it may be a stand-alone application wholly implemented on each one of user equipment 600 and user equipment 601. In such an approach, instructions of the application may be stored locally (e.g., in storage 608), and data for use by the application is downloaded on a periodic basis (e.g., from an out-of-band feed, from an internet resource, or using another suitable approach). Control circuitry 604 may retrieve instructions of the application from storage 608 and process the instructions to provide video conferencing functionality and generate any of the displays discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a conference participant profile. Control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the media application is a client/server-based application. Data for use by a thick or thin client implemented on each one of user equipment 600 and user equipment 601 may be retrieved on-demand by issuing requests to a server remote to each one of user equipment 600 and user equipment 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

In some embodiments, the media application may be downloaded and interpreted or otherwise run by an interpreter or virtual machine (run by control circuitry 604). In some embodiments, the media application may be encoded in the ETV Binary Interchange Format (EBIF), received by control circuitry 604 as part of a suitable feed, and interpreted by a user agent running on control circuitry 604. For example, the media application may be an EBIF application. In some embodiments, the media application may be defined by a series of JAVA-based files that are received and run by a local virtual machine or other suitable middleware executed by control circuitry 604. In some of such embodiments (e.g., those employing MPEG-2, MPEG-4, HEVC or any other suitable digital media encoding schemes), the media application may be, for example, encoded and transmitted in an MPEG-2 object carousel with the MPEG audio and video packets of a program.

As shown in FIG. 7, user equipment 706, 707, 708, 710 (which may correspond to, e.g., e.g., user equipment 104 of FIGS. 1A-1B; user equipment 204 of FIG. 2; user equipment 504 of FIGS. 5A-5D) may be coupled to communication network 709. Communication network 709 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 709) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 709.

System 700 may comprise media content source 702, one or more servers 704, and/or one or more edge computing devices. In some embodiments, the media application may be executed at one or more of control circuitry 711 of server 704 (and/or control circuitry of user equipment 706, 707, 708, 710 and/or control circuitry of one or more edge computing devices). In some embodiments, the media content source and/or server 704 may be configured to host or otherwise facilitate video communication sessions between user equipment 706, 707, 708, 710 and/or any other suitable user equipment, and/or host or otherwise be in communication (e.g., over network 709) with one or more social network services.

In some embodiments, server 704 may include control circuitry 711 and storage 714 (e.g., RAM, ROM, Hard Disk, Removable Disk, etc.). Storage 714 may store one or more databases. Server 704 may also include an I/O path 712. I/O path 412 may provide video conferencing data, device information, or other data, over a local area network (LAN) or wide area network (WAN), and/or other content and data to control circuitry 711, which may include processing circuitry, and storage 714. Control circuitry 711 may be used to send and receive commands, requests, and other suitable data using I/O path 712, which may comprise I/O circuitry. I/O path 712 may connect control circuitry 711 (and specifically control circuitry) to one or more communications paths.

Control circuitry 711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 411 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 711 executes instructions for an emulation system application stored in memory (e.g., the storage 714). Memory may be an electronic storage device provided as storage 414 that is part of control circuitry 711.

Figure 8:
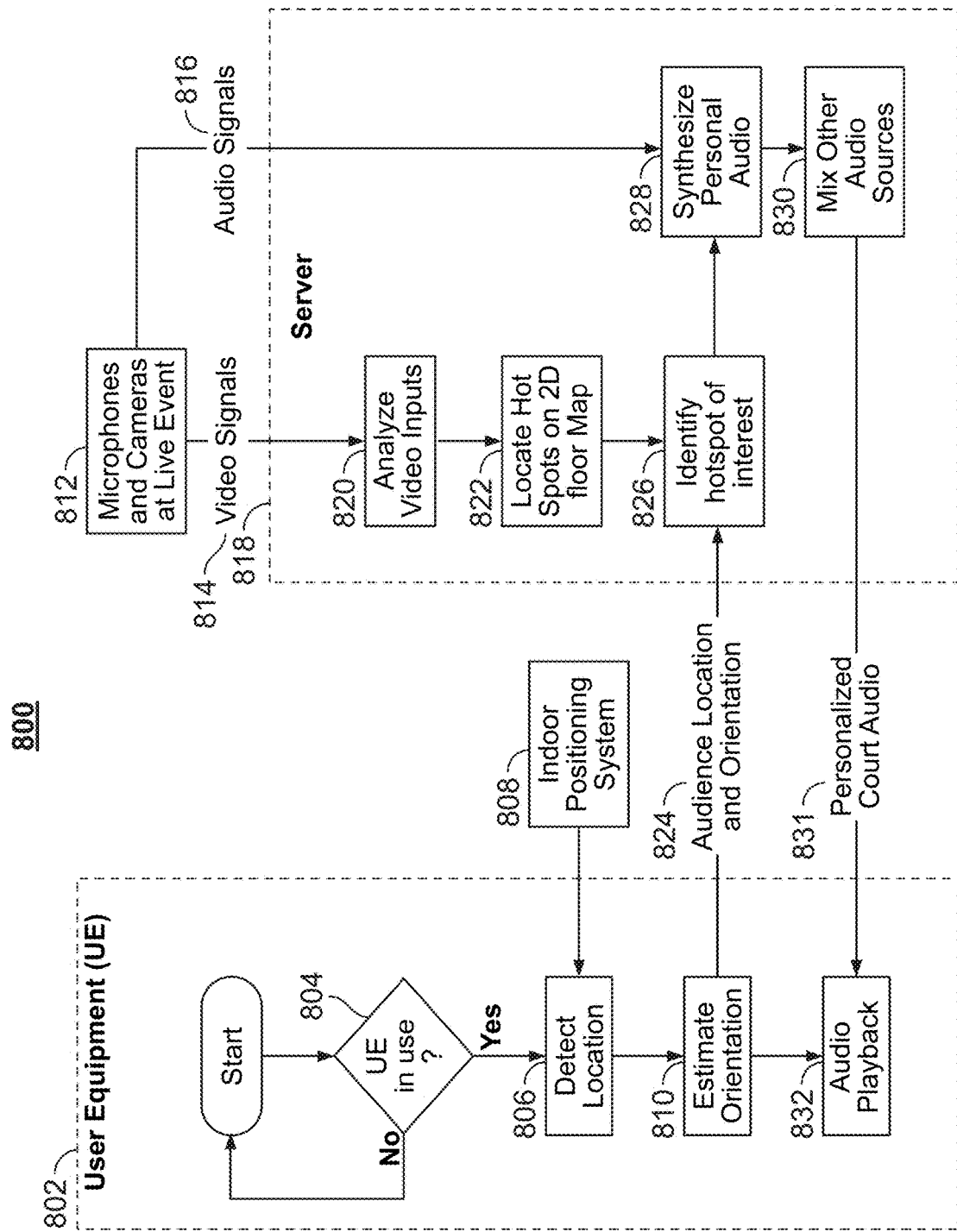
FIG. 8 is a flowchart of a detailed illustrative process for providing audio from a live event to a user, in accordance with some embodiments of this disclosure.

FIG. 8 is a flowchart of a detailed illustrative process 800 for providing audio from a live event to a user, in accordance with some embodiments of this disclosure. In various embodiments, the individual steps of process 800 may be implemented by one or more components of the devices, systems and methods of FIGS. 1-10 and may be performed in combination with any of the other processes and aspects described herein. Although the present disclosure may describe certain steps of process 800 (and of other processes described herein) as being implemented by certain components of the devices, systems and methods of FIGS. 1-10, this is for purposes of illustration only. It should be understood that other components of the devices, systems and methods of FIGS. 1-10 may implement those steps instead.

At 804, control circuitry (e.g., control circuitry of 604 of user equipment 600 or 601 of FIG. 6, which may correspond to user equipment 802 of FIG. 8, and/or control circuitry 711 of server 704, which may correspond to server 704 of FIG. 7), and/or I/O circuitry 602 of FIG. 6 or I/O circuitry 712 of FIG. 7, may determine whether user equipment 802 is in use. In some embodiments, determining whether user equipment 802 is in use may comprise determining whether audio output equipment (e.g., a headset, speaker or headphones 614 are being worn by, or otherwise used by a user, e.g., user 102 of FIG. 1A). In some embodiments, determining whether user equipment 802 is in use may comprise determining whether the user has requested the media application to provide him or her with audio of a portion of a live event. In some embodiments, user equipment 802 may comprise proximity sensors and/or light sensors or any other suitable type of sensors, to check whether the user equipment 802 is on the ears of, or is otherwise being worn and/or used by, the user.

At 806, the control circuitry may detect a location of the user (e.g., user 102 of FIG. 1A). In some embodiments, an indoor positioning system 808 (e.g., at the venue of the live event, and which may collect and/or analyze wireless signals and/or sensors of user equipment 802 to determine a user's location), and/or GPS signal, may be used to detect the location of the user within a venue of the live event (e.g., basketball arena 100), or to detect that a user is not present at the live event. In some embodiments, a user's electronic ticket information may be used to determine a location of the user at the live event.

At 810, the control circuitry may estimate an orientation of user equipment 802 (and/or of the user, e.g., user 102 of FIG. 1A, using user equipment 802). In some embodiments, user equipment 802 may comprise a geomagnetic field sensor (e.g., providing an approximate orientation of the audience) and/or an accelerometer (e.g., providing a more fine-grained orientation), and/or any other suitable type of sensor, which may be used to infer or provide the orientation information. In some embodiments, the orientation and/or portion of the live event a user is currently gazing at (e.g., for a user that is in-person at the live event, or a portion of a device screen via which a user is viewing one or more video streams of the live event) may be determined at 810, based on user input, e.g., eye tracking, gaze or focus spot of the user, head orientation, touch or voice input, biometric input, and/or any other suitable input. In some embodiments, the control circuitry may employ a trained machine learning model to refine the orientation, which may take into account the historical orientations and their synchronized locations (e.g., of a basketball or certain players) in relation to a particular type of live event. In some embodiments, user equipment 802 may be a mobile device which can provide the position and orientation signal, and/or the user may use the mobile device to indicate the orientation.

Server 818 (which may correspond to server 704 of FIG. 7), and/or user equipment 802, may be provided with video signals 814 and audio signals 816 from microphones and cameras 812 at the live event (e.g., a professional basketball game at basketball area 100 having various microphones installed or otherwise present at the basketball arena, or any other suitable live event). At 820, the control circuitry may analyze video input corresponding to the video signals 814, to locate (at 822) candidate hot spots on a 2D map (e.g., map 300 of FIG. 3) of the live event. As nonlimiting examples, the control circuitry may identify a portion of the live event where a basketball is being dribbled or shot, a location of the best player in the game (e.g., Lebron James), or, if the live event is a concert, a location of the lead singer. As another example, the control circuitry may identify trending selections (e.g., trending selections 158 of user interface 140, or portions of the arena corresponding to microphones experiencing the highest quality and/or fidelity audio, or any other suitable candidate hotspots, or any combination thereof).

At 826, the control circuitry may identify a hotspot of interest. In some embodiments, the hotspot of interest may be determined based on audience location and orientation information 824 having been determined at 806 and/or 810, from among the plurality of candidate portions of interest or hotspots determined at 822. In some embodiments, the hotspot of interest may be identified as a hotspot from among the plurality of candidate hotspots determined at 822 that is closest to a portion of the live event that the user is determined to be gazing at or oriented towards, or may be determined automatically, or may be determined based on user input. That is, the control circuitry may use location and orientation data together with the live analytic data from one or more video streams of the game to determine the approximate location the user is focusing on. In some embodiments, the control circuitry may determine the hotspot of interest using one or more geometric techniques, e.g., computing the distance between each candidate hotspot of interest and a line that corresponds to a user's location and/or orientation and/or gaze. In some embodiments, any suitable computer-implemented technique (e.g., a computer vision based analytic module) may determine key events or hotspots at the live event (e.g., on the basketball court) based on video inputs 820. For example, the hotspots may correspond to a location of basketball or specific superstars on the court or specific coaches on the sideline. In some embodiments, during a commercial break or other break in the action of the live event, hot spots may correspond to the gathering of players with their coach, or where players are arguing or even fighting with each other. Such events may be determined based on, for example, learning-based detection, recognition, and tracking algorithms.

In some embodiments, a machine learning model may be trained to accept as input the location (determined at 806), the orientation (determined at 810) and the candidate hotpots (determined at 822), and output a hotspot of interest at 826. For example, the machine learning model may be trained to recognize patterns based on historical examples of a hotspot of interest which was selected when similar inputs have been received. In some embodiments, such training examples may be labeled by manual editors. In some embodiments, hotspots selected by a user (e.g., having similar characteristics to the current user) and/or having selected a hotspot in a similar venue and/or when situated at a similar location or orientation and/or similar candidate hotspots. In some embodiments, the control circuitry may choose the closest hot spot and project it on to an oriented ray from the user location and use this hotspot as the hotspot of interest.

At 828, the control circuitry may synthesize audio personalized to the user, e.g., using one or more of the techniques discussed in connection with FIG. 4 or FIGS. 5A-5D. The control circuitry may obtain audio from one or more microphones identified as being in a vicinity of the hotspot of interest. At 830, the control circuitry may optionally mix other audio sources (e.g., sports betting information and/or live game commentary) with the synthesized audio at 828, and/or modify or remove one or more portions of audio, if such portions are determined to comprise profane or explicit language, or private conversations, or strategic conversations, or any other audio deemed not to be suitable for the user to hear. In some embodiments, user equipment 804 may provide for a switch or option to choose generated audio signals, commentary, or both.

At 832, the control circuitry may cause audio playback associated with the determined hotspot of interest to be rendered at user equipment 802 based on received generated personalized audio signals 831, to enable an audience member at the live event (or at home) to be provided with audio at a portion of the live event (e.g., a specific location on the basketball court of the basketball arena 100 of FIG. 1A) that he or she is interested in. In some embodiments, user equipment 802 may be configured to have the capability of a low latency wireless connection (e.g., wireless Internet, a cellular network, or any other suitable wireless connection, or any combination thereof), to facilitate the reception of generated personalized audio signals 831, as well as provide sensor data from sensors of user equipment 802 to server 818. In some embodiments, personalized audio signals 831 may be generated on-device at user equipment 802, or at server 818, or any combination thereof.

In some embodiments, if the control circuitry determines, based on received user input, that the user has quickly changed, or otherwise changed, his or her attention to another hot spot, audio at the previous hot spot may fade out, followed by fading in of the new audio, to provide for a smooth audio transition. In some embodiments, the control circuitry may receive (e.g., via the I/O circuitry) input indicating that the user wishes to be provided with audio of a soundscape associated with a particular object (e.g., a basketball) or a particular person (e.g., the athlete Lebron James) participating in a performance at the live event, for a certain period of time or until further input is received. In such a circumstance, audio may be provided to the user independent of where the user's gaze is located, such as based on tracking of the object or person's location, without the user having to actually look at the portion of interest, or a hybrid option (e.g., option 150 of FIG. 1B) may be provided.

In some embodiments, user equipment 802 may be configured to comprise ultra directional speakers for rendering spatial audio. In some embodiments, user equipment 802 may correspond to a user's personal device, on which the media application may be installed or otherwise provided.

Alternatively, user equipment 802 may correspond to a device provided by an organization providing or hosting the live event.

Figure 9:
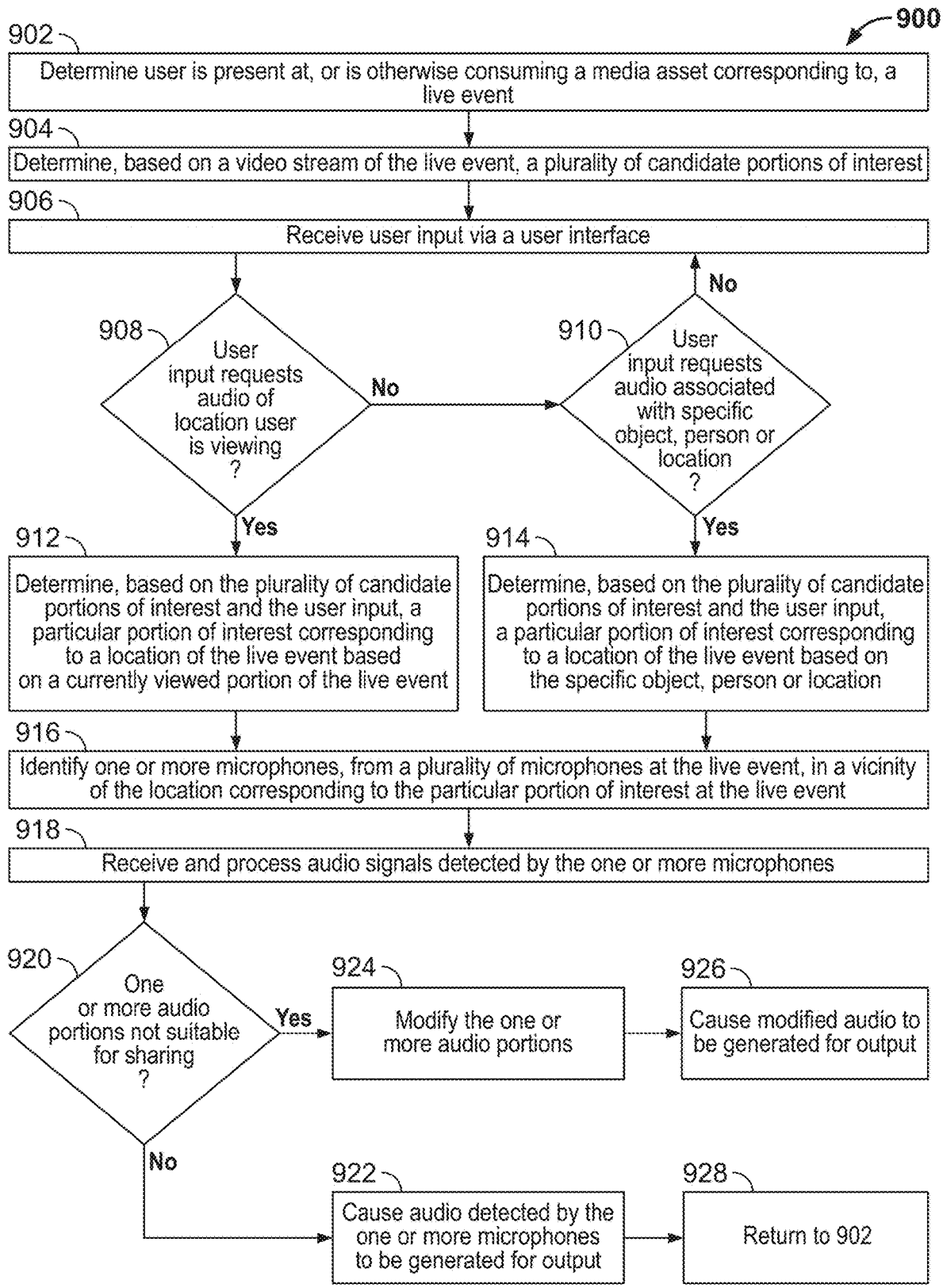
FIG. 9 is a flowchart of a detailed illustrative process for providing audio from a live event to a user, in accordance with some embodiments of this disclosure

FIG. 9 is a flowchart of a detailed illustrative process 900 for providing audio from a live event to a user, in accordance with some embodiments of this disclosure. In various embodiments, the individual steps of process 900 may be implemented by one or more components of the devices, systems and methods of FIGS. 1-10 and may be performed in combination with any of the other processes and aspects described herein. Although the present disclosure may describe certain steps of process 900 (and of other processes described herein) as being implemented by certain components of the devices, systems and methods of FIGS. 1-10, this is for purposes of illustration only. It should be understood that other components of the devices, systems and methods of FIGS. 1-10 may implement those steps instead.

At 902, control circuitry (e.g., control circuitry of 604 of user equipment 600 or 601 of FIG. 6, which may correspond to user equipment 802 of FIG. 8, and/or control circuitry 711 of server 704, which may correspond to server 704 of FIG. 7), and/or I/O circuitry 602 of FIG. 6 or I/O circuitry 712 of FIG. 7, may determine that a user is present at, or is otherwise consuming a media asset corresponding to, a live stream of an event. For example, the control circuitry may determine that user 102 of FIG. 1B is in attendance at a live event (e.g., a professional basketball game) based on input received from the user via user equipment 104, based on data or sensor signals provided by user equipment 104, or using any other suitable technique, or any combination thereof. As another example, the control circuitry may determine that user 202 of FIG. 2B is consuming a media asset 203 (e.g., one or more video streams) corresponding to the live event, and is not in attendance at the live event, e.g., based on input received from the user via user equipment 204, based on data or sensor signals provided by user equipment 204, or using any other suitable technique, or any combination thereof.

At 904, the control circuitry may determine, based on one or more video streams of the live event, a plurality of candidate portions of interest. For example, the control circuitry may identify trending selections 158 shown at user interface 140 of FIG. 1B, or trending selections 258 of user interface 240 of FIG. 2. In some embodiments, the control circuitry may identify the candidate portions of interest by parsing one or more video streams of the live event, e.g., based on video footage of the live event captured by cameras 131, 132, 134 and 136, to identify key objects (e.g., a basketball) or persons (e.g., superstar players or coaches performing or otherwise in a vicinity of the basketball game or other performance at the live event). In some embodiments, 904 of FIG. 9 may be performed in a similar manner to 822 of FIG. 8. In some embodiments, the control circuitry may map the candidate portions of interest to a 2D map (e.g., map 300 of FIG. 3).

At 906, the control circuitry may receive input via a user interface (e.g., user interface 140 of FIG. 1B or user interface 240 of FIG. 2). For example, the control circuitry may determine whether the user input corresponds to a gaze of a user at a particular portion of the live event, which may be determined by tracking the user's eyes, e.g., with user equipment 104 of FIG. 1B or user equipment 204 of FIG. 2. As another example, the control circuitry may determine whether the user input corresponds to a selection associated with option 144 of FIG. 1B, or one of options 148, 150, 154, and/or 156 of FIG. 1B, or selection of an option from trending selections 158 of FIG. 1B. As another example, the control circuitry may determine whether the user input corresponds to a selection associated with option 244 of FIG. 2, or one of options 248, 250, 252, 254, and/or 256 of FIG. 2, or selection of an option from trending selections 258 of FIG. 2.

At 908, the control circuitry may determine whether the user input requests to be provided with audio of the location the user is viewing, e.g., based on receiving selection of option 152 of FIG. 1B and/or option 156 of FIG. 1B, or based on receiving selection of option 252 of FIG. 2 and/or option 256 of FIG. 2, or based on receiving a command (e.g., a voice command) requesting to provide audio tracking the user's gaze location; if so, processing may proceed to 912. Otherwise, processing may proceed to 910. In some embodiments, the control circuitry may by default, e.g., in the absence of user selection of an option via user interface 140 of FIG. 1B or user interface 240 of FIG. 2, to provide audio of the location the user is viewing, and proceed to 912. Otherwise, processing may proceed to 910.

At 910, the control circuitry may determine whether the user input requests audio associated with specific object, person or location, e.g., based on receiving selection of option 148, 150 or a trending option from portion 158 of FIG. 1B, or based on receiving selection of option 248, 250 or a trending option from portion 258 of FIG. 2. In some embodiments, the control circuitry may by default, e.g., in the absence of user selection of an option via user interface 140 of FIG. 1B or user interface 240 of FIG. 2, track a person or object in the live event that is indicated in the user's profile as a favorite object or favorite person or object of interest, or may by default track the location of a particular object (e.g., the ball in a sports game or person (e.g., the most popular person in a given live event, such as the athlete Lebron James). An affirmative determination at 910 may cause processing to proceed to 914; otherwise processing may return to 906.

At 912, the control circuitry may determine, based on the plurality of candidate portions of interest and the user input, a particular portion of interest corresponding to a location of the live event based on a currently viewed portion of the live event. For example, the control circuitry may compare the viewing direction of the viewer (e.g., a line of vision of the user, determined by one or more sensors of user equipment 104 of FIG. 1B), and identify a particular portion of interest, from the plurality of candidate portions of interest identified at 1004, that is closest to the line of vision of the user. As another example, the control circuitry may track a gaze of the user and determine a closest portion of interest to the gaze or within a field of view of the user. In some embodiments, 912 may comprise determining a portion that a user is currently gazing at (e.g., in person at the live event in the example of FIG. 1B, or a portion of the screen of television 206 in the example of FIG. 2), and identify such portion as the portion of interest, without referencing, or without identifying, candidate portions of interest.

At 914, the control circuitry may determine, based on the plurality of candidate portions of interest and the user input, a particular portion of interest corresponding to a location of the live event based on the specific object, person or location. For example, as shown in the example of FIG. 1A, the control circuitry may receive selection of a particular portion of the live event by the user dragging microphone icon 145 to a certain area of the live event (on user interface 140 of user equipment 104) or by selecting option 154 to lock the user's selection to a particular object (e.g., the basketball) or a particular person (e.g., Steph Curry). As another example, the control circuitry may receive selection of a particular trending selection at portion 158 of user interface 140. The control circuitry may identify the objects or persons or certain locations in real time based on tags and/or bounding shapes tracking and/or associated with objects, persons or locations in frames of one or more video streams (e.g., captured by cameras 130, 131, 132 and/or 134 of FIG. 1A).

As another example, as shown in the example of FIG. 2, the control circuitry may receive selection of a particular portion of the live event by the user dragging microphone icon 245 to a certain area of the live event (on user interface 240 of user equipment 240) or by selecting option 254 to lock the user's selection to a particular object (e.g., the basketball) or a particular person (e.g., Steph Curry). As another example, the control circuitry may receive selection of a particular trending selection at portion 258 of user interface 240. The control circuitry may identify the objects or persons or certain locations in real time based on tags and/or bounding shapes tracking and/or associated with objects, persons or locations in frames of one or more video streams (e.g., captured by cameras 230, 231, 232 and/or 234 of FIG. 2).

As another example, if option 150 of FIG. 1B, or option 250 of FIG. 2, is selected, the control circuitry may employ a hybrid approach of, e.g., providing audio tracking the user's line of vision or gaze or field of view, but ignoring the user's line of vision or gaze or field of view if one or more conditions are met, e.g., if the star athlete Steph Curry has the ball, or if the star athletes Lebron James and Steph Curry are matched up against or otherwise interacting with each other).

At 916, the control circuitry may identify one or more microphones, from a plurality of microphones at the live event, in a vicinity of the location corresponding to the particular portion of interest at the live event. As an example, the control circuitry may identify, as the microphone(s) for which audio is to be obtained for the portion of interest and provided to the user (e.g., user 102 of FIGS. 1A-1B), a closest microphone to the portion of interest or hotspot (e.g., athlete 402 dribbling a basketball in FIG. 4). For example, the hotspot may be projected onto a representation of the court (e.g., via 2D map 300 of FIG. 2) and the projected location may be compared to locations of various microphones installed at the venue or otherwise present in the venue.

As another example, the control circuitry may identify, as the microphone(s) for which audio is to be obtained for the portion of interest and provided to the user (e.g., user 102 of FIGS. 1A-1B), a closest predefined (or dynamically determined) number of microphones (e.g., 3 or any other suitable number) relative to portion of interest 402, using any suitable technique. For example, the control circuitry may implement a Delaunay triangulation algorithm to partition the set of microphone locations 106 . . . 130 of FIG. 1A into triangles so that each location at the live event (e.g., on the basketball court of FIG. 1A) is associated with a particular triangle, where microphones (e.g., installed under the basketball court, or at any other suitable location) may each be placed at a particular vertex of a particular triangle. In the example of FIG. 4, point 404 (*a*) may correspond to the portion of interest or hotspot (e.g., athlete 402), and points 406, 408 and 410 may correspond to vertices of a triangle and locations of respective microphones $a_1$, $a_2$, $a_3$ at the live event (e.g., installed under the basketball court, or at any other suitable location). In some embodiments, a user may be permitted to specify which microphone(s) to be used to provide the audio to the user.

Since the portion of interest may be constantly changing (e.g., the basketball moving around the live event), the control circuitry may be configured to track the location of such portion of interest and dynamically update the microphones used to obtain audio for the portion of interest in real time.

At 918, the control circuitry may receive and process audio signals detected by the one or more microphones identified at 916. In some embodiments, the control circuitry may generate a weighted combination of synthesized microphone signals of a microphone array corresponding to audio of a particular portion of interest or hotspot.

At 920, the control circuitry may determine (e.g., based on processing performed at 918) whether one or more portions of the audio are not suitable for sharing. For example, the control circuitry may implement any suitable computer-implemented technique (e.g., a machine learning model) to analyze detected audio to determine whether one or more portions of the audio correspond to profane or explicit language, or private or confidential conversations, or tactical or strategic conversations related to the live event, or any other language not suitable to be provided to the user. If so, processing may proceed to 924; otherwise processing may proceed to 922.

At 924, the control circuitry may modify the one or more audio portions determined at 920 not to be suitable for the user, e.g., the control circuitry may mute the audio for such portions, or replace the audio with commentary of the broadcasters, or replace the audio with sports betting information, or any other suitable content, or any combination thereof, to prevent the portions of audio from being provided to the user. In some embodiments, the user may be notified that he or she is not permitted to hear this portion of the audio.

At 922, the control circuitry may cause audio detected by the one or more microphones identified at 916 to be generated for output, e.g., via user equipment 102 of FIG. 1, or user equipment 204 or 206 of FIG. 2. At 926, the control circuitry may cause audio as modified at 924 to be generated for output, e.g., via user equipment 102 of FIG. 1, or user equipment 204 or 206 of FIG. 2. At 928, processing may return to 902, or any other suitable step of FIG. 9, to continue determining, and providing audio for, portions of interest of the live event.

The features disclosed herein may enable different users to be provided with different, personalized audio experiences for a same portion of a live event in real time, whether the user is consuming the live event in person or via a media asset at another location. For example, substantially simultaneously with a particular play of a basketball game, a first user may elect to listen to audio of the player with the ball, while another user may elect to listen to audio of the coach, while yet another user may elect to be provided with audio matching his or her gaze. In some embodiments, such features may be provided as a premium service for spectators of a live event, and may increase viewer desire and interest in watching the live event at the arena with the personalized audio stream, and/or outside the arena via one or more video streams combined with the personalized audio stream.

Figure 10:
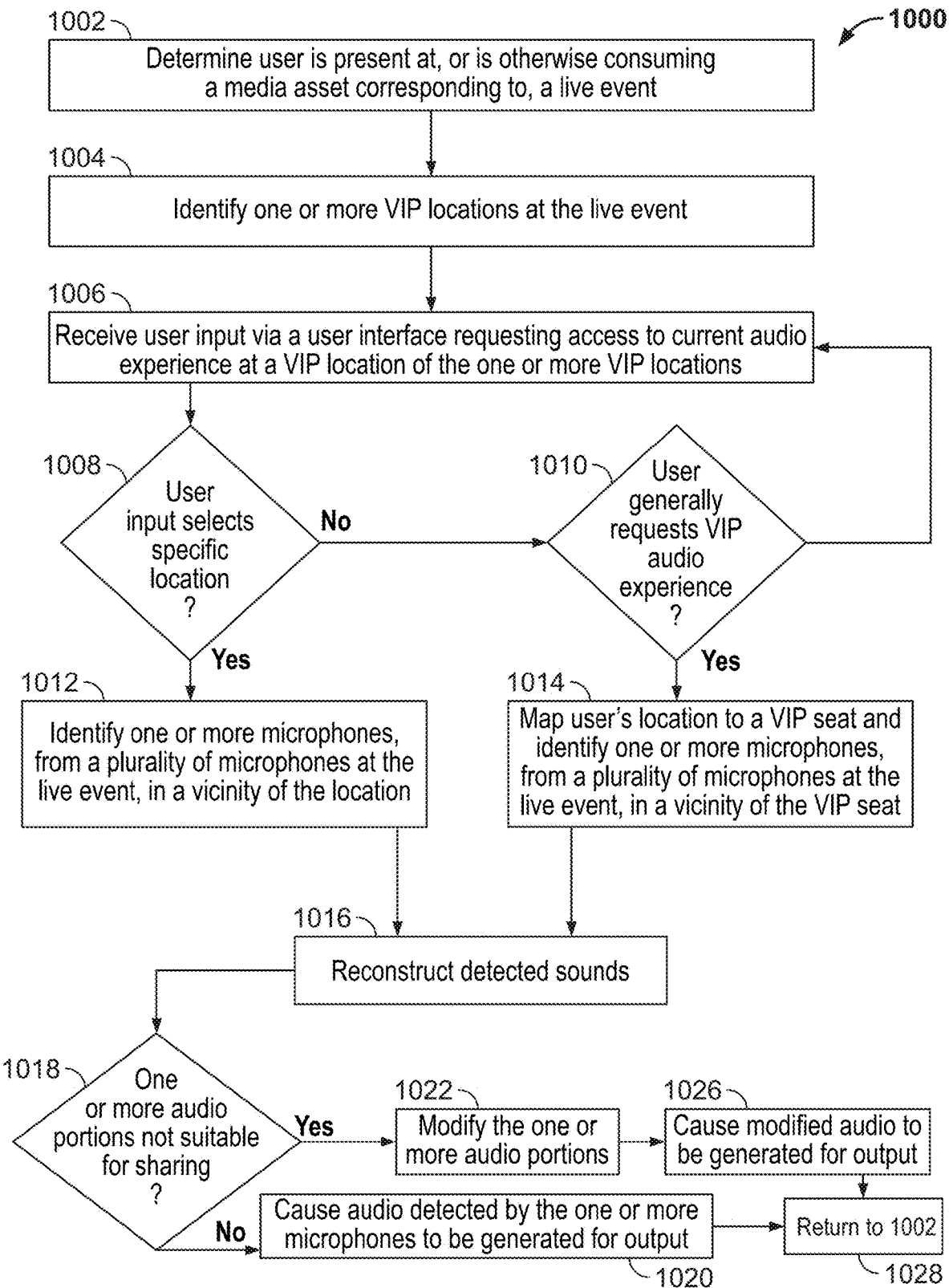
FIG. 10 is a flowchart of a detailed illustrative process 1000 for providing audio from a live event to a user, in accordance with some embodiments of this disclosure.

FIG. 10 is a flowchart of a detailed illustrative process 1000 for providing audio from a live event to a user, in accordance with some embodiments of this disclosure. In various embodiments, the individual steps of process 1000 may be implemented by one or more components of the devices, systems and methods of FIGS. 1-10 and may be performed in combination with any of the other processes and aspects described herein. Although the present disclosure may describe certain steps of process 1000 (and of other processes described herein) as being implemented by certain components of the devices, systems and methods of FIGS. 1-10, this is for purposes of illustration only. It should be understood that other components of the devices, systems and methods of FIGS. 1-10 may implement those steps instead.

At 1002, control circuitry (e.g., control circuitry of 604 of user equipment 601 or 602 of FIG. 6, which may correspond to user equipment 802 of FIG. 8, and/or control circuitry 711 of server 704, which may correspond to server 704 of FIG. 7), and/or I/O circuitry 602 of FIG. 6 or I/O circuitry 712 of FIG. 7, may determine that a user is present at, or is otherwise consuming a media asset corresponding to, a live event. For example, the control circuitry may determine that user 102 of FIG. 1B is in attendance at a live event (e.g., a professional basketball game) based on input received from the user via user equipment 104, based on data or sensor signals provided by user equipment 104, or using any other suitable technique, or any combination thereof. As another example, the control circuitry may determine that user 202 of FIG. 2B is consuming a media asset 203 (e.g., one or more video streams) corresponding to live stream of the live event, and is not in attendance at the live event, e.g., based on input received from the user via user equipment 204, based on data or sensor signals provided by user equipment 204, or using any other suitable technique, or any combination thereof.

At 1004, the control circuitry may identify one or more VIP locations at the live event, e.g., VIP seats 508, 510, 512, 514, 516 of FIG. 5A. The control circuitry may determine that seats 508, 510, 512, 514, 516 of FIG. 5A are VIP seats based on referencing a data structure (e.g., stored at storage 608 of FIG. 6, and/or server 704 of FIG. 7 and/or database 705 of FIG. 7) indicating that such seats are VIP seats. As another example, the control circuitry may analyze a video and/or audio feed of the live event to determine whether a particular seat is a VIP seat, e.g., by determining that a captured video frame depicts an attendee that is a celebrity at a particular seat, such as by comparing images of the video feed to known images of a celebrity or other VIP, or by determining that an audio broadcast mentions that a celebrity or other VIP is in attendance at the live event, or using any other suitable computer-implemented technique.

At 1006, the control circuitry may receive user input via a user interface requesting access to current audio experience at a VIP location of the one or more VIP locations. For example, in the example of FIG. 5B, the control circuitry may provide user interface 501 to user 502. User 502 may be in attendance at the live event (e.g., a professional basketball game, or any other suitable live event) and may be sitting at, or otherwise present at, seat 505 of the venue 500 (e.g., a basketball arena), or user 502 may be viewing a stream or broadcast of the live event from his or her home or other location.

User interface 501 of FIG. 5B may comprise indication 522 prompting user 502 to select a location at the live event (e.g., a particular VIP seat) that he or she is interested in the audio of. For example, user interface 501 may enable user 502 to drag and drop microphone icon 520 to, or otherwise specify a selection of, a portion (e.g., a seat) of a representation of venue 500. As another example, user interface 501 may comprise option 524 to instruct the control circuitry to identify an optimal VIP seat (e.g., seat 526) corresponding to the user's particular viewing angle (e.g., determined based on a gaze of user 502). The portion of interest may be identified automatically (e.g., without user input) or manually or semi-manually (e.g., in a manner responsive to user input).

At 1008, the control circuitry may determine whether the user input specifies a specific location (e.g., VIP seat 512) of FIG. 5A. If so, processing may proceed to 1012; otherwise, processing may proceed to 1010.

At 1010, the control circuitry may determine whether the user has generally requested a VIP audio experience (e.g., based on the user selecting option 524, or based on selection of a trending option from portion 528). If so, processing may return to 1006; otherwise, processing may proceed to 1014. In some embodiments, by default, e.g., without receiving explicit user input, processing may proceed to 1014.

At 1012, the control circuitry may identify one or more microphones, from a plurality of microphones at the live event, in a vicinity of the location specified at 1008. In some embodiments, the control circuitry may identify one or more microphones closest to the specified location (e.g., at or around VIP seat 512 if VIP seat 512 is selected) from among the plurality of microphones.

At 1014, the control circuitry may map the user's location to a VIP seat and identify one or more microphones, from a plurality of microphones at the live event, in a vicinity of the VIP seat. For example, in FIG. 5A, a line of vision 515 from the user's seat 505 may be projected towards the court (e.g., onto map 300 of FIG. 3), and a VIP seat (e.g., VIP seat 514) intersected by or otherwise closest to the line of vision may be selected.

At 1016, the control circuitry may reconstruct the detected sounds. In some embodiments, 1016 may be performed in a similar manner as 918. In some embodiments, to reconstruct the perceived spatial sound at the corresponding VIP seat (e.g., VIP seat 514 of FIG. 5A or VIP seat 526 of FIG. 5B) to user 502 (e.g., at seat 505 of FIG. 5A), the control circuitry may apply the Huygens-Fresnel principle, or any other suitable technique. For example, the sound received at VIP seat 514 may be captured by microphones of microphone array 506, and the control circuitry may reconstruct such received sound by treating each of such microphones as a new sound source, e.g., replacing the original sound sources with an array of virtual sound sources in front of (or otherwise adjacent to or in a vicinity of) the VIP seat 514, where each virtual sound source may play the captured sound by each corresponding microphone.

The control circuitry may have access to each microphone's location (e.g., stored in a data structure), as well as the VIP Seat's location (e.g., stored in a data structure) and the orientation of user 502 (e.g., inferred based on a gaze of the user associated with user equipment 504 and/or based on other suitable input). Based on such data, the sound at the VIP seat can be synthesized and simulated (e.g., to user 502 at seat 505, as if user 502 was seated at the VIP seat) using the user's personal HRTF. Such aspects may be used to accumulate signals from each relevant microphone as a virtual sound source and then sum such signals for filtering by the transfer function, to enable user 502 to perceive the audio experience at VIP seat 514.

1018-1026 of FIG. 10 may be performed in a similar manner to 920-926, respectively, of FIG. 9. In some embodiments, the features of FIG. 10 may be enabled in response to a user selecting an option to purchase audio of a VIP seat. Such techniques may be configured to virtually position the user to hear what a person at a particular location is hearing or would have heard at such location, to simulate spatial audio of the VIP seat.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
   receiving user input via a user interface;
   determining, based on the received user input, a particular portion of interest corresponding to a location at a live event, wherein the location corresponding to the particular portion of interest is a location of an object or a person associated with the live event;
   tracking a plurality of locations of the object or the person over time;
   identifying, for each respective tracked location of the plurality of locations of the object or the person, at least one microphone in a vicinity of the respective tracked location corresponding to the object or the person at the live event; and
   causing audio detected by the at least one microphone at each respective tracked location to be generated for output.

2. The method of claim 1, wherein:
   a plurality of microphones are located at respective locations at the live event;
   identifying the at least one microphone at each respective tracked location comprises identifying a subset of the plurality of microphones to be used to detect the audio; and
   causing the audio detected by the subset of the plurality of microphones to be generated for output comprises:
   receiving a plurality of audio signals detected by the subset of the plurality of microphones;
   determining a weighted combination of the plurality of audio signals; and
   synthesizing the plurality of audio signals based on the weighted combination.

3. The method of claim 1, further comprising:
   generating for display at the user interface an option to indicate the particular portion of interest from among a plurality of candidate portions of interest at the live event,
   wherein receiving the user input comprises receiving selection via the user interface of the option corresponding to the particular portion of interest.

4. The method of claim 1, wherein receiving the user input comprises detecting a gaze of a user, the method further comprising:
   determining a location within a performance occurring at the live event at which the detected gaze of the user is directed; and
   determining as the particular portion of interest, from among a plurality of candidate portions of interest at the live event, the location at which the gaze of the user is directed.

5. The method of claim 1, further comprising:
   determining, based on one or more video streams of the live event, a plurality of candidate portions of interest;
   wherein determining, based on the received user input, the particular portion of interest comprises:
   identifying, based on the received user input, a potential portion of interest;
   comparing the potential portion of interest to the plurality of candidate portions of interest; and
   determining the particular portion of interest based on the comparison.

6. The method of claim 1, wherein:
   the plurality of locations of the particular portion of interest comprises:
   a first plurality of locations of the person, the person being a performer participating in a performance occurring at the live event, or
   a second plurality of locations of the object, the object being interacted with by one or more performers participating in the performance occurring at the live event.

7. The method of claim 1, wherein:
   the live event is a sporting event; and
   causing the audio detected by the at least one microphone to be generated for output further comprises merging the audio detected by the at least one microphone with audio commentary from a broadcast of the sporting event.

8. The method of claim 1, further comprising:
   monitoring the audio detected by the at least one microphone at each respective tracked location; and
   preventing a portion of the audio from being generated for output to a user associated with the user input, based on determining that the portion of the audio detected by the at least one microphone comprises profanity, a private conversation or a strategic conversation related to a performance occurring at the live event or is otherwise not permitted to be shared with the user associated with the user input.

9. The method of claim 1, wherein the live event is a sporting event, and the particular portion of interest comprises a player performing in the sporting event.

10. A computer-implemented method comprising:
    receiving user input via a user interface;
    determining an orientation of a user, associated with the user input, in relation to a performance occurring at a live event;
    inputting to a trained machine learning model an indication of the orientation and indications of a plurality of candidate portions of interest;
    determining, based on the inputting to the trained machine learning model and based on the received user input, a particular portion of interest based on an output of the trained machine learning model;
    identifying one or more microphones in a vicinity of a location corresponding to the particular portion of interest at the live event; and
    causing audio detected by the one or more microphones to be generated for output.

11. The method of claim 10, wherein the user associated with the user input is in attendance at the live event, the method further comprising:

determining a location of the user at the live event,
wherein the inputting to the trained machine learning model further comprises inputting the location of the user to the trained machine learning model.

12. A system comprising:
input/output circuitry configured to:
receive user input via a user interface; and
control circuitry configured to:
determine, based on the received user input, a particular portion of interest corresponding to a location at a live event, wherein the location corresponding to the particular portion of interest is a location of an object or a person associated with the live event;
track a plurality of locations of the object or the person over time;
identify, for each respective tracked location of the plurality of locations of the object or the person, at least one microphone in a vicinity of the respective tracked location corresponding to the object or the person at the live event; and
cause audio detected by the at least one microphone at each respective tracked location to be generated for output.

13. The system of claim 12, wherein:
a plurality of microphones are located at respective locations at the live event; and
the control circuitry is configured to:
identify the at least one microphone at each respective tracked location by identifying a subset of the plurality of microphones to be used to detect the audio; and
cause the audio detected by the subset of the plurality of microphones to be generated for output by:
receiving a plurality of audio signals detected by the subset of the plurality of microphones;
determining a weighted combination of the plurality of audio signals; and
synthesizing the plurality of audio signals based on the weighted combination.

14. The system of claim 12, wherein:
the control circuitry is further configured to generate for display at the user interface an option to indicate the particular portion of interest from among a plurality of candidate portions of interest at the live event; and
the input/output circuitry is configured to receive the user input by receiving selection via the user interface of the option corresponding to the particular portion of interest.

15. The system of claim 12, wherein:
the input/output circuitry is configured to receive the user input by detecting a gaze of a user; and
the control circuitry is further configured to:
determine a location within a performance occurring at the live event at which the detected gaze of the user is directed; and
determine as the particular portion of interest, from among a plurality of candidate portions of interest at the live event, the location at which the gaze of the user is directed.

16. The system of claim 12, wherein the control circuitry is further configured to:
determine, based on one or more video streams of the live event, a plurality of candidate portions of interest; and
determine, based on the received user input, the particular portion of interest by:
identifying, based on the received user input, a potential portion of interest;
comparing the potential portion of interest to the plurality of candidate portions of interest; and
determining the particular portion of interest based on the comparison.

17. The system of claim 12, wherein:
the plurality of locations of the particular portion of interest comprises:
a first plurality of locations of the person, the person being a performer participating in a performance occurring at the live event, or
a second plurality of locations of the object being interacted with by one or more performers participating in the performance occurring at the live event.

18. The system of claim 12, wherein the control circuitry is further configured to:
determine an orientation of a user, associated with the user input, in relation to a performance occurring at the live event;
input to a trained machine learning model an indication of the orientation and indications of a plurality of candidate portions of interest; and
determine, based on the inputting to the trained machine learning model, the particular portion of interest based on an output of the trained machine learning model.

19. The system of claim 18, wherein the user associated with the user input is in attendance at the live event, and the control circuitry is further configured to:
determine a location of the user at the live event; and
input the location of the user to the trained machine learning model.

20. The system of claim 12, wherein:
the live event is a sporting event; and
the control circuitry is further configured to cause the audio detected by the at least one microphone to be generated for output by merging the audio detected by the at least one microphone with audio commentary from a broadcast of the sporting event.

* * * * *